(12) United States Patent
Powell et al.

(10) Patent No.: US 12,382,971 B2
(45) Date of Patent: Aug. 12, 2025

(54) GRAVITY FED SMOKER

(71) Applicant: Masterbuilt Manufacturing, LLC, Columbus, GA (US)

(72) Inventors: Olin Powell, Columbus, GA (US); Adam Carter, Auburn, AL (US); Robert V. Terrell, Auburn, AL (US); Daniel Mercer, Hamilton, GA (US)

(73) Assignee: Premier Specialty Brands, LLC, Chamblee, GA (US)

( * ) Notice: Subject to any disclaimer, the term of this patent is extended or adjusted under 35 U.S.C. 154(b) by 660 days.

(21) Appl. No.: 16/535,826

(22) Filed: Aug. 8, 2019

(65) Prior Publication Data

US 2020/0093145 A1   Mar. 26, 2020

Related U.S. Application Data

(60) Provisional application No. 62/733,739, filed on Sep. 20, 2018.

(51) Int. Cl.
*A23B 4/052* (2006.01)
*A47J 37/07* (2006.01)

(52) U.S. Cl.
CPC ......... *A23B 4/0523* (2013.01); *A47J 37/0718* (2013.01); *A47J 37/0754* (2013.01); *A47J 37/0786* (2013.01); *A23B 4/052* (2013.01)

(58) Field of Classification Search
CPC ............... A47J 37/0718; A47J 37/0754; A47J 37/0786; A47J 37/0727; A47J 37/0704;
(Continued)

(56) References Cited

U.S. PATENT DOCUMENTS 3,326,201 A * 6/1967 Murray .................. A47J 37/06
110/309
3,433,211 A   3/1969 Latta
(Continued)

FOREIGN PATENT DOCUMENTS

CA         193031      10/2021
CL       199501200      7/1996
(Continued)

OTHER PUBLICATIONS

Wadhah, Enhancement of Natural Convection Heat Transfer from the Rectangular Fins by Circular Perforations, 2011, International Journal of Automotive and Mechanical Engineering, pp. 434 and 436 (Year: 2011).*

(Continued)

*Primary Examiner* — Ibrahime A Abraham
*Assistant Examiner* — Franklin Jefferson Wang
(74) *Attorney, Agent, or Firm* — Miller & Martin PLLC

(57) ABSTRACT

A gravity fed smoker includes a smoking enclosure and an external stack. The stack is double walled with an inner wall, and an outer wall. A vented cooling space exists between the inner wall and the outer wall. An inner chamber of the external stack includes a fire box with a fire grate and a feed hopper positioned above the fire box. A smoke tunnel with a series of openings for releasing smoke into the smoking enclosure extends along the bottom of the food smoking enclosure and is connected to the external fire box at one end. Fuel, including charcoal, lump coal, or wood pellets, is loaded into the feed hopper. As the fuel burns on the fire grate and turns to ashes, the fuel is fed from the hopper onto the fire grate by gravity. A fan and dampers controls air flow through the fire grate and into the smoke tunnel.

22 Claims, 24 Drawing Sheets

(58) Field of Classification Search
CPC ..... A47J 37/07; A47J 37/0713; A23B 4/0523; A23B 4/052; A23B 4/044; A21B 1/26
See application file for complete search history.

(56) References Cited

U.S. PATENT DOCUMENTS

| | | | |
|---|---|---|---|
| 3,581,731 A | | 6/1971 | Schultze |
| 4,043,312 A | | 8/1977 | Kern |
| 4,348,948 A | | 9/1982 | Allison |
| 4,624,301 A | * | 11/1986 | Baggott ............... F24C 15/322 165/47 |
| 4,700,618 A | * | 10/1987 | Cox, Jr. ............... A23B 4/052 99/481 |
| 5,195,423 A | | 3/1993 | Beller |
| 5,226,407 A | * | 7/1993 | Kalenian ............ A47J 37/0713 126/293 |
| 5,251,607 A | | 10/1993 | Traeger et al. |
| 5,713,267 A | | 2/1998 | Wilson |
| 7,100,599 B2 | | 9/2006 | Babington |
| 7,895,942 B2 | | 3/2011 | Karau |
| 8,800,542 B1 | * | 8/2014 | Kennington ........ F24B 15/005 99/333 |
| 9,140,448 B2 | | 9/2015 | Freeman |
| 2007/0131234 A1 | * | 6/2007 | Moore ................. A23B 4/052 131/296 |
| 2008/0060632 A1 | | 3/2008 | Leverty |
| 2009/0004348 A1 | * | 1/2009 | Silva .................... A23B 4/052 426/315 |
| 2010/0028502 A1 | | 2/2010 | Han |
| 2010/0263654 A1 | | 10/2010 | Cusak |
| 2012/0012096 A1 | * | 1/2012 | Cusack ............... A47J 37/0786 432/3 |
| 2012/0107476 A1 | | 5/2012 | McLemore et al. |
| 2012/0167868 A1 | | 7/2012 | Chang |
| 2013/0192476 A1 | * | 8/2013 | Broerman ............ A23B 4/044 99/482 |
| 2013/0228161 A1 | | 9/2013 | Ahmed |
| 2013/0239823 A1 | * | 9/2013 | Re ....................... A23B 4/052 99/474 |
| 2014/0030401 A1 | | 1/2014 | Cusak |
| 2014/0261005 A1 | | 9/2014 | Karau |
| 2014/0360387 A1 | * | 12/2014 | Bogdon ............. A23B 4/0523 99/476 |
| 2014/0366863 A1 | * | 12/2014 | Coffman ............. F24B 1/022 126/25 R |
| 2015/0096448 A1 | | 4/2015 | Wingerd et al. |
| 2016/0209042 A1 | | 7/2016 | Yu |
| 2017/0164783 A1 | * | 6/2017 | Sauerwein .......... A47J 37/0786 |
| 2018/0132660 A1 | * | 5/2018 | Suchevits ........... A47J 37/0786 |
| 2018/0296031 A1 | | 10/2018 | Terrell, Jr. et al. |

FOREIGN PATENT DOCUMENTS

| | | | | |
|---|---|---|---|---|
| CL | 200501969 | | 5/2006 | |
| CL | 201300956 | | 8/2013 | |
| CL | 201501441 | | 9/2015 | |
| CN | 107258877 | | 10/2017 | |
| DE | 202010015614 U1 | * | 4/2011 | ............ A23B 4/044 |
| EP | 7687611-0001 | | 10/2020 | |
| FR | 2890301 A1 | * | 3/2007 | .......... A47J 37/0718 |
| KR | 20130045288 A | * | 5/2013 | |
| KR | 101708370 B1 | * | 2/2017 | |
| KR | 20170000940 | | 3/2017 | |
| KR | 20170000940 U | * | 3/2017 | |
| RU | 174253 | | 10/2017 | |
| RU | 174253 U1 | * | 10/2017 | |
| WO | 2018/191255 | | 10/2018 | |

OTHER PUBLICATIONS

Wadhah, Enhancement of Natural Convection Heat Transfer from the Rectangular Fins by Circular Perforations, 2011, International Journal of Automotive and Mechanical Engineering, pp. 8 and 10 (Year: 2011).*

Beach Pit BBQ, Everything you Want to Know About Wood, Smoke, and Combustion, 2016, https://web.archive.org/web/20170626202513/https://beachpitbbq.com/everything-want-know-wood-smoke-combustion/ (Year: 2016).*

International Search Report/Written Opinion released by the U.S. Receiving Office as Inernational Search Authority on Nov. 12, 2019 for corresponding International Application No. PCT/US2019/045707; 13 pages.

"Stumps Smokers Jr. Model" available at https://www.fullbullbbq.com/test-image-post/ (Apr. 16, 2013).

Assassin cabinet style smoker available at https://www.facebook.com/assassinsmokers/photos/1638551916219657 (Sep. 5, 2017).

* cited by examiner

GRAVITY FED SMOKER

CLAIM OF PRIORITY

This application claims priority from U.S. Provisional Patent Application Ser. No. 62/733,739, filed on Sep. 20, 2018, which is incorporated herein in its entirety.

FIELD OF THE INVENTION

This invention relates to a smoker/grill for cooking food while imparting a smoked flavor to the food and more particularly to a smoker with an external gravity fed heat source.

BACKGROUND OF THE INVENTION

Traditional smokers use a solid fuel, such as charcoal, lump coal, or wood pellets positioned inside the food smoking enclosure. Such an arrangement requires the user to open the lid or door of the smoker periodically during the smoking process in order to replenish the solid fuel and remove the ashes. Such replenishment of fuel and removal of ash represents a nuisance when the time to smoke food can extend for several hours. Periodically opening the door or lid of the smoking enclosure also allows the smoke to escape and disrupts the temperature within the smoking enclosure.

SUMMARY OF THE INVENTION

A gravity fed smoker of the present invention eliminates the need to access the food smoking enclosure during the smoking process to replenish the solid fuel of the smoker or to remove ashes. Particularly, the gravity fed smoker includes a food smoking enclosure and an external stack. The food smoking enclosure is supported on four legs which in turn are supported on four wheels to facilitate movement of the smoker. The front of the food smoking enclosure includes a lid for gaining access to the interior of the food smoking closure. One or more grill racks are positioned within the food smoking enclosure for supporting the food to be cooked and smoked. A drip shield is supported on the bottom of the food smoking enclosure for catching drippings from the food being cooked and smoked and for funneling the drippings into a removable drip pan. The back of the food smoking enclosure includes an adjustable smoke outlet.

The external stack is connected to one side of the food smoking enclosure. The external stack is generally rectangular in shape with four sides, a bottom, and a top opening. The stack is double walled with an inner wall and an outer wall. The inner wall defines an inner chamber. A cooling space exists between the inner wall and the outer wall. In a first embodiment, the outer wall is essentially continuous with circulation openings at the top and bottom. In a second embodiment the outer wall is slotted over most of its surface to assure that the surface of the outer wall remains at a safe temperature. The inner chamber of the external stack includes a fire box with a fire grate. The fire box is positioned near the bottom of the inner chamber of the external stack and adjacent an inlet opening of a smoke tunnel positioned along the bottom of the food smoking enclosure. The fire box has a smoke outlet that connects to the smoke inlet of the smoke tunnel.

A fan with a fan outlet is connected to the fire box below the fire grate. In a first embodiment, the amount of air delivered by the fan to the fire grate can be controlled manually or automatically either by use of a variable speed fan or by varying the duty cycle of a constant speed fan. In a second embodiment, a check flapper is positioned in the fan outlet to ensure that hot air does not flow from the fire box to the fan when the fan is shut off. In addition, a manual combustion air damper is positioned in the fan outlet to control the amount of air from the fan to the fire box and to shut off air to the fire box after cooking has been completed and the fan is turned off. Shutting off air to the fire box after cooking has been completed serves to extinguish the fuel in the fire box and thereby conserve fuel.

As previously stated, the smoke tunnel extends along the bottom of the food smoking enclosure from side to side. The smoke tunnel inlet at one end of the smoke tunnel extends through one side of the food smoking enclosure. The other end of the smoke tunnel is closed. A series of openings in the sides of the smoke tunnel extend along the length of the smoke tunnel to allow smoke and heat to flow from the smoke inlet of the smoke tunnel into the food smoking enclosure and out the smoke outlet of the food smoking enclosure. In a first embodiment of the present invention, the openings in the smoke tunnel are progressively larger starting from the smoke inlet opening of the smoke tunnel in order to evenly distribute the smoke and heat into the food smoking enclosure. In a second embodiment of the present invention the openings in the smoke tunnel has the larger openings at the inlet and the closed end of the smoke tunnel with smaller openings near the middle of the smoke tunnel. The second embodiment also includes a smoke damper that controls the amount of smoke flowing from the fire box into the smoke tunnel. Closing the smoke damper after cooking has been completed serves to extinguish the fuel in the fire box and thereby conserve fuel.

An ash pan is positioned in the inner chamber of the stack below the fire grate to catch the ashes from the solid fuel burning on the fire grate. The ash pan is also designed to receive larger wood chunks that will smolder under the falling embers. This allows additional flavoring of the smoke that permeates the food smoking enclosure. The stack has an access door near the bottom of the stack adjacent the ash pan for removal of the ash pan as necessary and during startup, access for lighting the fuel supported on the fire grate.

The inner chamber also includes a feed hopper for containing solid fuel, such as charcoal, lump coal, or wood pellets. The feed hopper is positioned above and connected to the top of the fire box. The inner chamber of the stack has a top opening for loading solid fuel into the feed hopper. The stack has a top lid that closes the top opening and seals the inner chamber. In the first embodiment, the lid has an adjustable lid vent to control the burn rate of the solid fuel. Also, in the first embodiment, the outer wall of the external stack has top vents near the top of the stack and bottom vents in the bottom of the stack that communicate with the cooling space so that air can circulate from the bottom vents, through the cooling space, and out the top vents to cool the inner wall of the stack and keep the outer stack wall at a safe temperature. In the second embodiment, the outer stack wall of the external stack has multiple slots in order to provide maximum air flow to the inner stack wall and thereby to keep the outer stack wall at a safe temperature.

A utility tray is attached on one external side of the food smoking enclosure to provide a place for holding food and utensils. In the first embodiment, a warming tray is attached to one side of the stack and utilizes the heat from the stack to keep food warm that has already been cooked or to warm plates in anticipation of serving the food.

In operation, the feed hopper is loaded with solid fuel in the form of charcoal, lump coal, or wood pellets. The solid fuel descends by gravity and rests on the fire grate of the fire box. By means of the access door at the bottom of the stack, the user can access the bottom of the fire grate and light the solid fuel on the fire grate. During the lighting process and initial startup, the lid vent in the first embodiment may be opened and the fan may be run at a high speed in order to rapidly increase combustion and initial startup temperature. Once the fuel has been lit, and the fire box has reached an initial high startup temperature, the lid vent is closed, and the fan speed is reduced. Alternatively, in the second embodiment, the fan can operate at a fixed speed, and the amount of air supplied to the fire box is controlled by the combustion air damper in the fan outlet.

During the cooking and smoking operation, the fan speed, in the first embodiment, is controlled to provide air below the fire grate to maintain combustion and to force the resulting smoke and heat out of the fire box smoke outlet, into the smoke tunnel inlet, out of the smoke tunnel openings, and into the food smoking enclosure. In the second embodiment, the amount of air delivered to the fire box is controlled by the combustion air damper in the fan outlet. Because after initial startup the inner chamber of the stack is sealed by the lid and the closed lid vent, the solid fuel does not burn up the stack. Instead combustion is controlled by the volume of air delivered by the fan as the solid fuel burns just above the fire grate, and the ash drops through the fire grate into the ash pan below. As the ash drops through the fire grate, the solid fuel above the fire grate drops under the force of gravity onto the fire grate to replace the spent fuel and ash. The falling ash and embers will cause additional wood chunks in the ash pan to smolder providing for additional flavor profiles.

In the first embodiment with the lid vent open and the fan running at a fairly high-speed and air volume, the grill rack inside the food smoking enclosure initially can be raised to a temperature sufficient to sear meat placed on the grill rack (approximately 1000° F.). Subsequently, by closing the lid vent and adjusting the air flow from the fan downward, the temperature inside the food smoking enclosure can be lowered to slowly and continuously cook and smoke delicate foods (cheese and fish) in the food smoking enclosure (140° F.). The temperature can also be controlled by opening the lid of the food smoking enclosure. In the second embodiment, the internal temperature in the food smoking enclosure is initially raised to a high temperature by running the fan at fairly high-speed with the combustion air damper open and the smoke damper open. Subsequently, the temperature in the food smoking enclosure can be modulated by adjusting the combustion air damper and or the smoke damper as well as the fan speed.

Further objects, features and advantages will become apparent upon consideration of the following detailed description of the invention when taken in conjunction with the drawings and the appended claims.

DETAILED DESCRIPTION OF THE PREFERRED EMBODIMENTS

Figure 1:
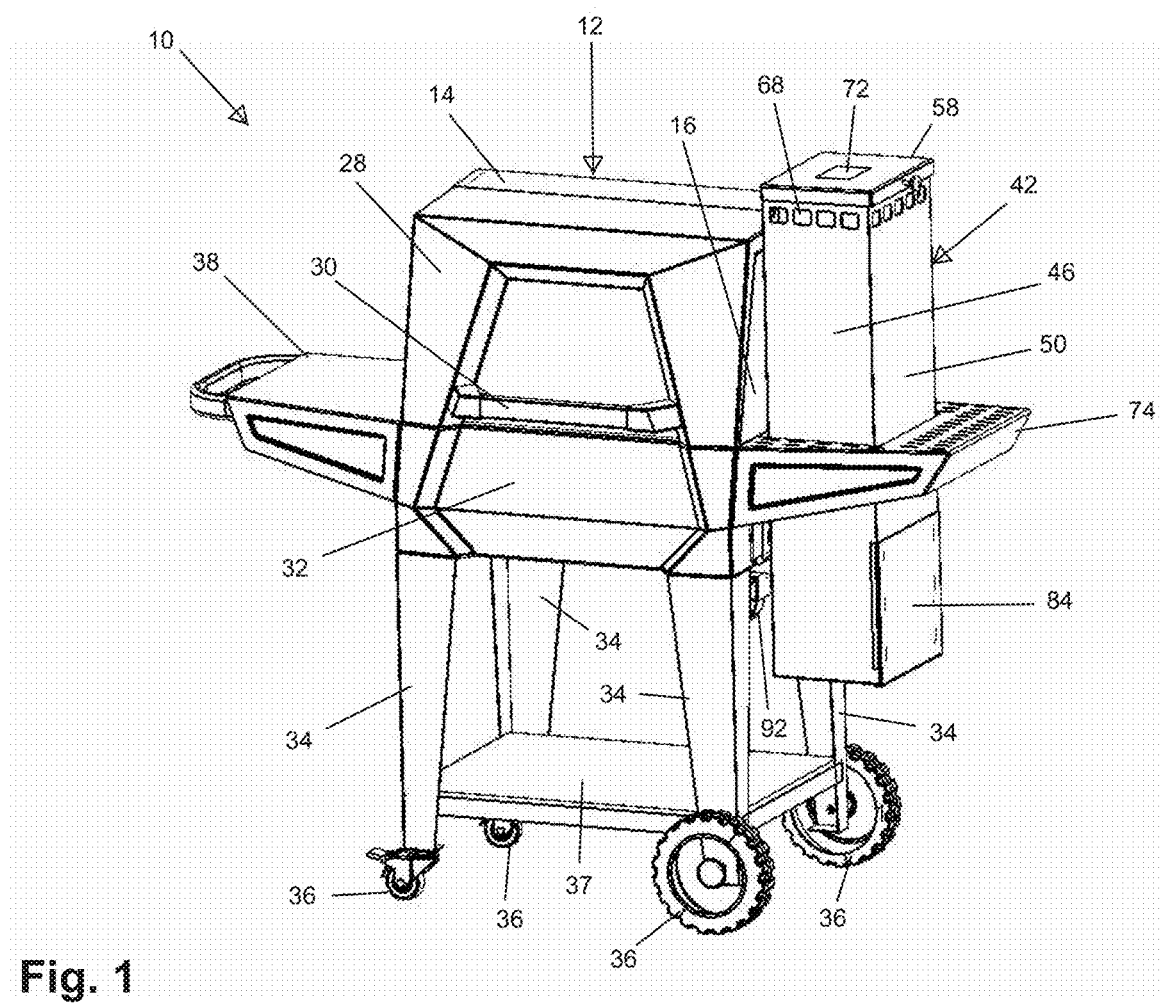
FIG. 1 is a front perspective view of a first embodiment of a gravity fed smoker in accordance with the present invention.
Figure 2:
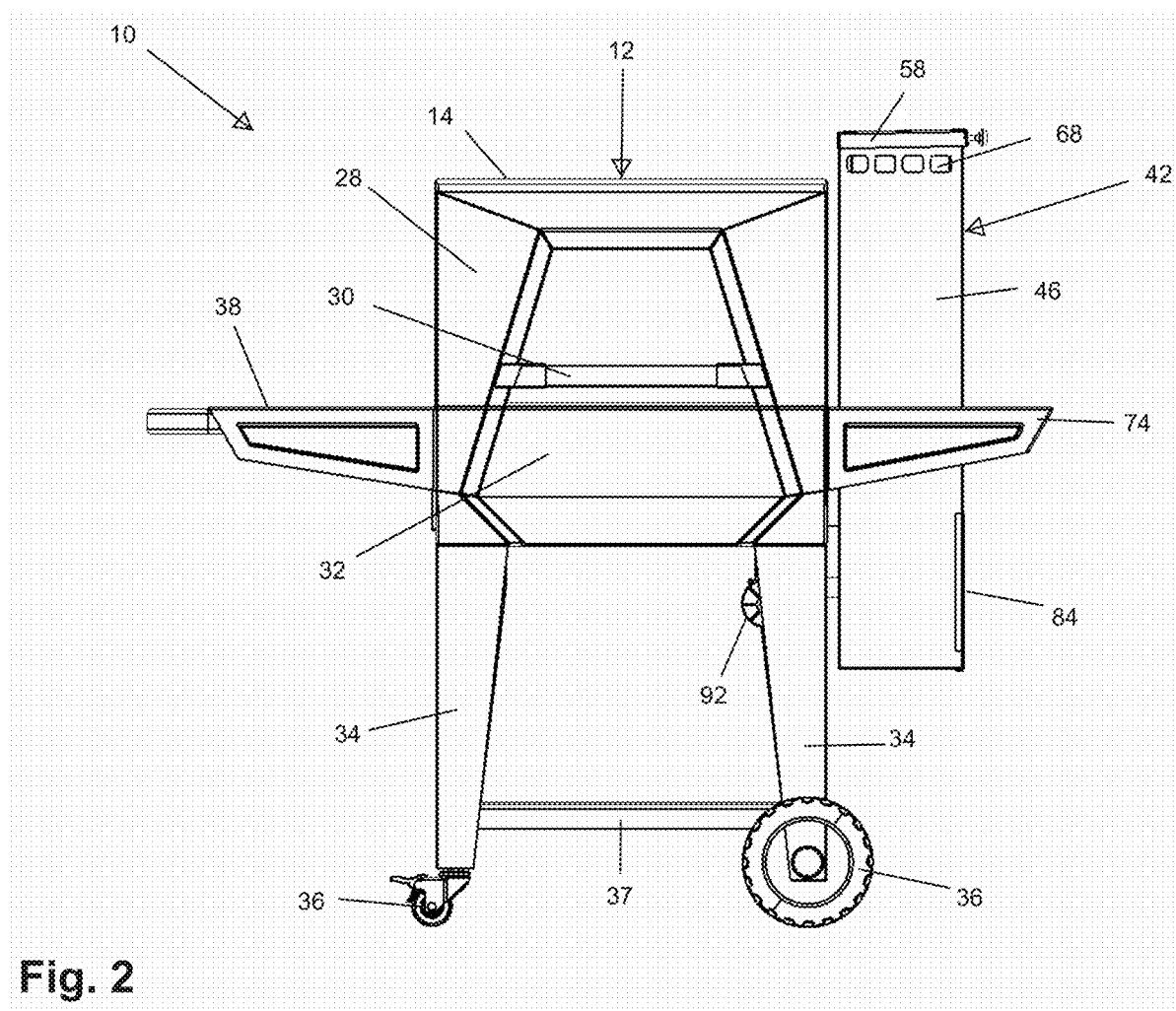
FIG. 2 is a front elevation view of the first embodiment of the gravity fed smoker in accordance with the present invention.
Figure 3:
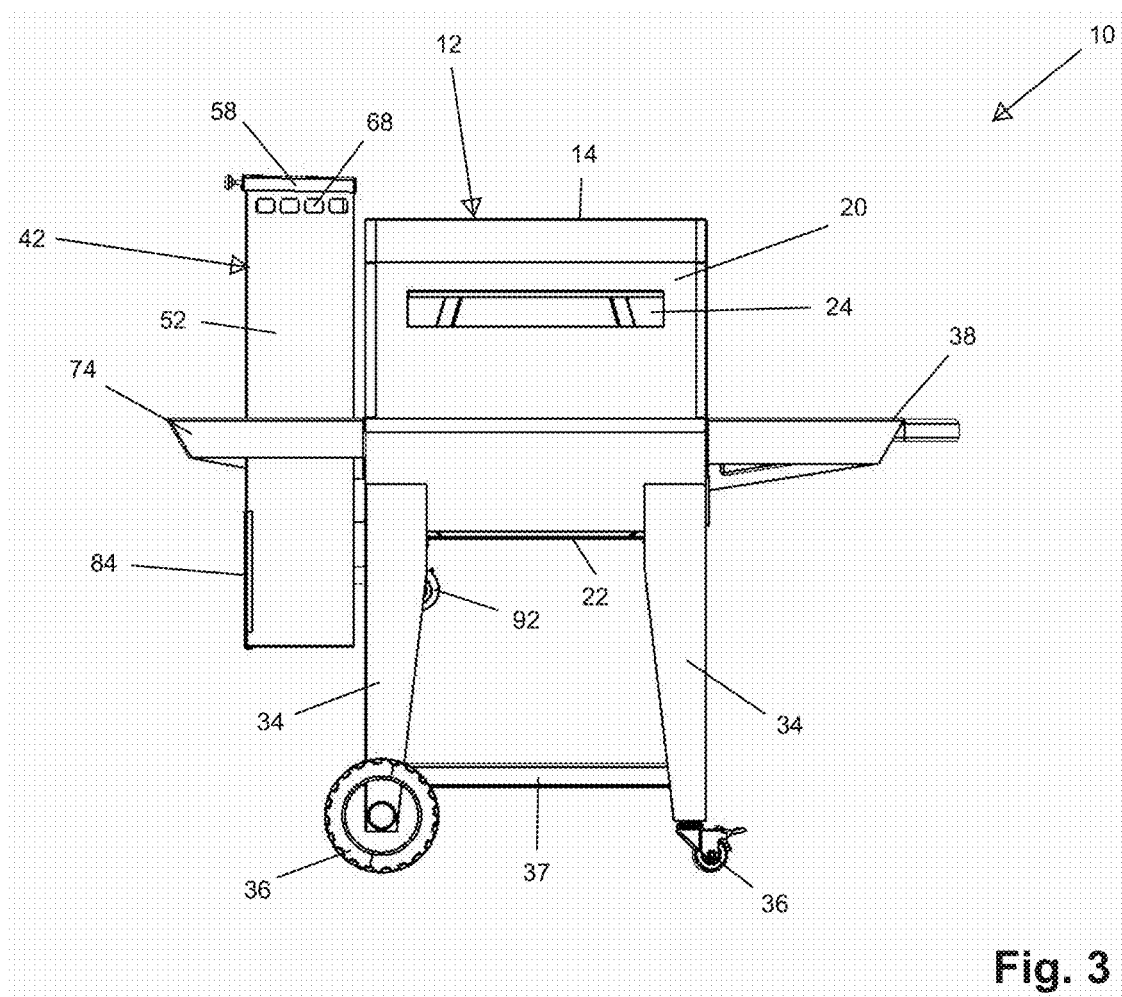
FIG. 3 is a back elevation view of the first embodiment of the gravity fed smoker in accordance with the present invention.
Figure 4:
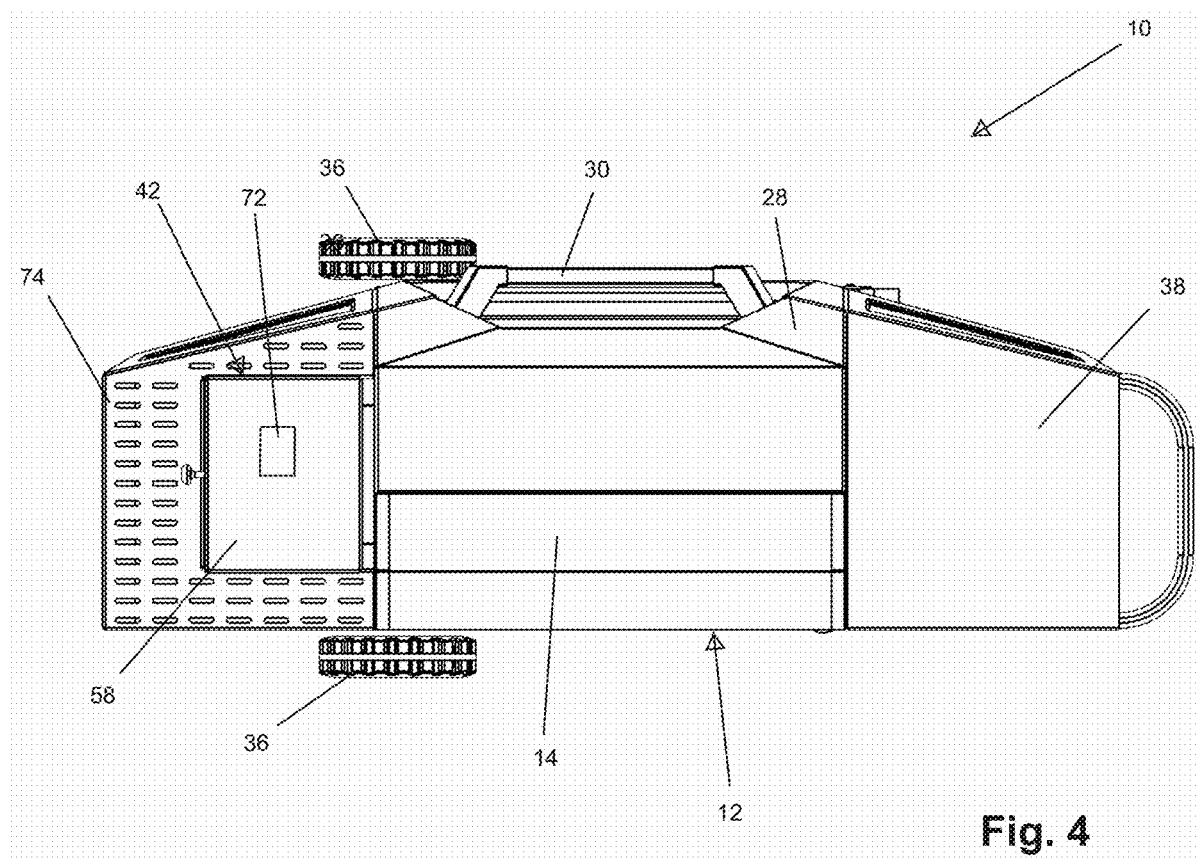
FIG. 4 is a top plan view of the first embodiment of the gravity fed smoker in accordance with the present invention.
Figure 5:
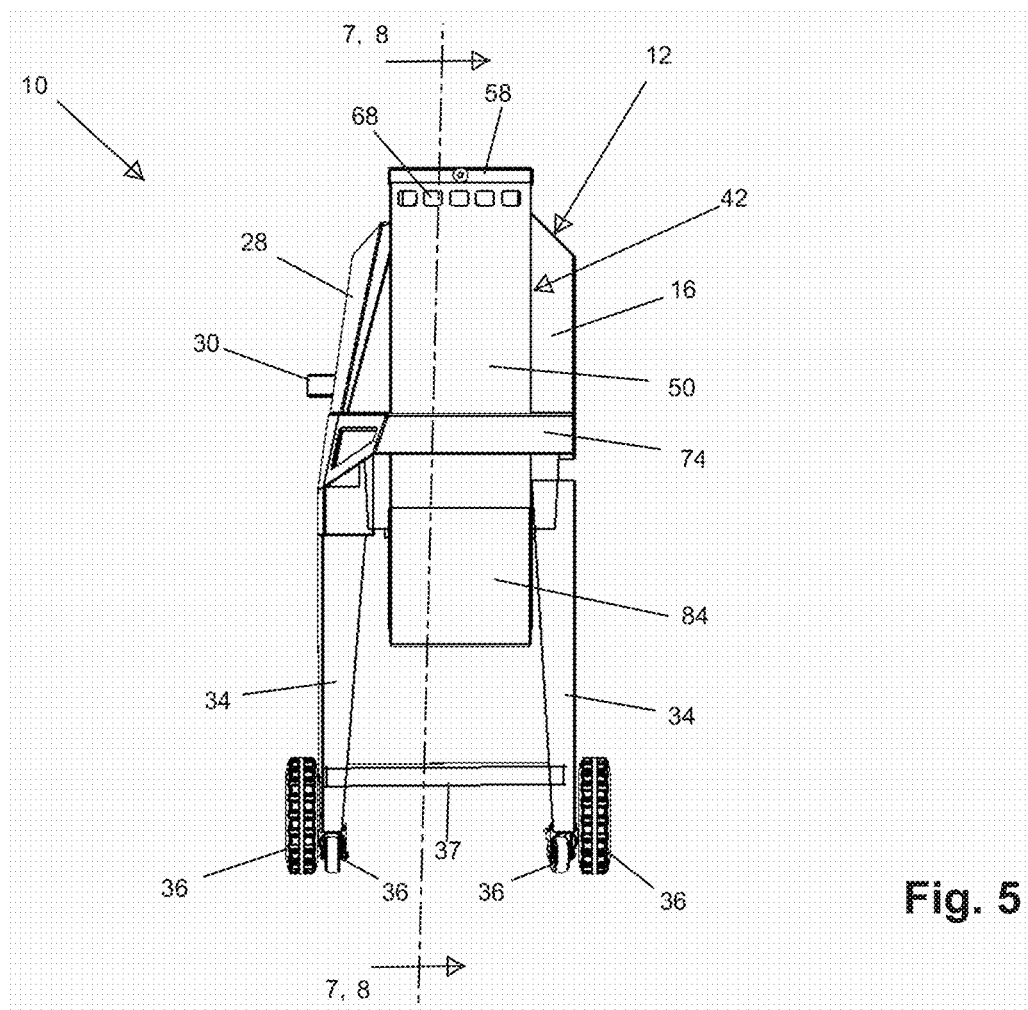
FIG. 5 is a right side elevation view of the first embodiment of the gravity fed smoker in accordance with the present invention.
Figure 6:
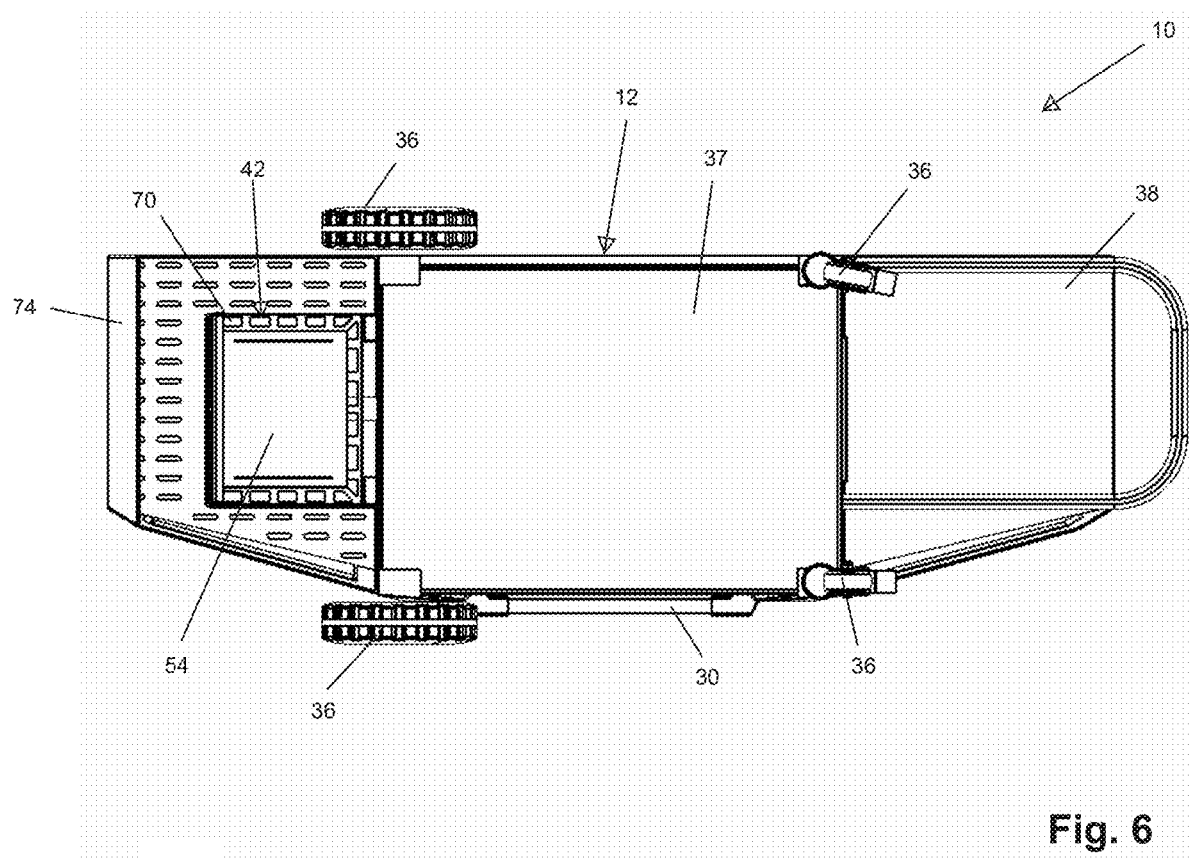
FIG. 6 is a bottom plan view of the first embodiment of the gravity fed smoker in accordance with the present invention.
Figure 7:
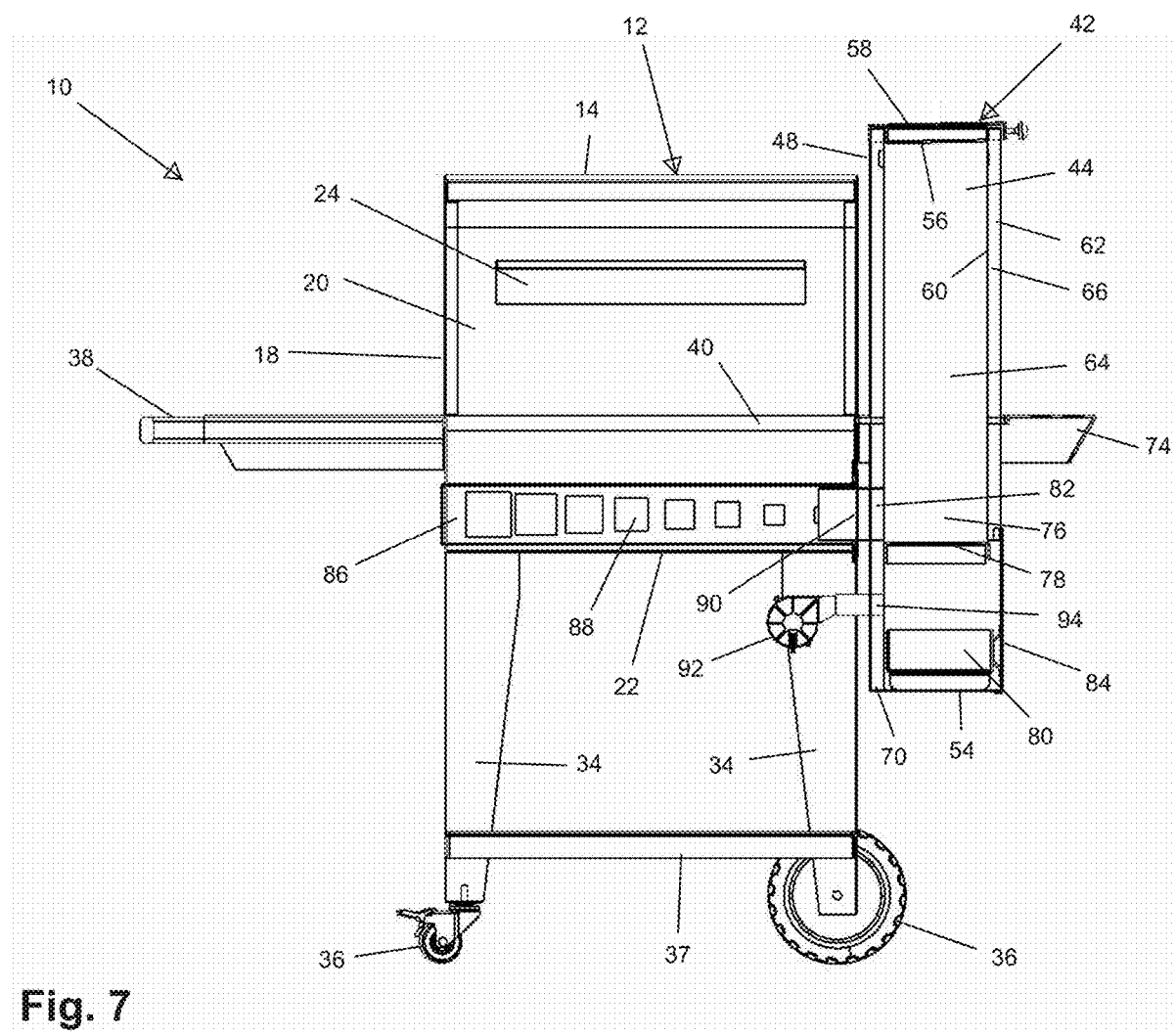
FIG. 7 is a front elevation section view of the first embodiment of the gravity fed smoker as seen along line 7-7 of FIG. 5 in accordance with the present invention.
Figure 8:
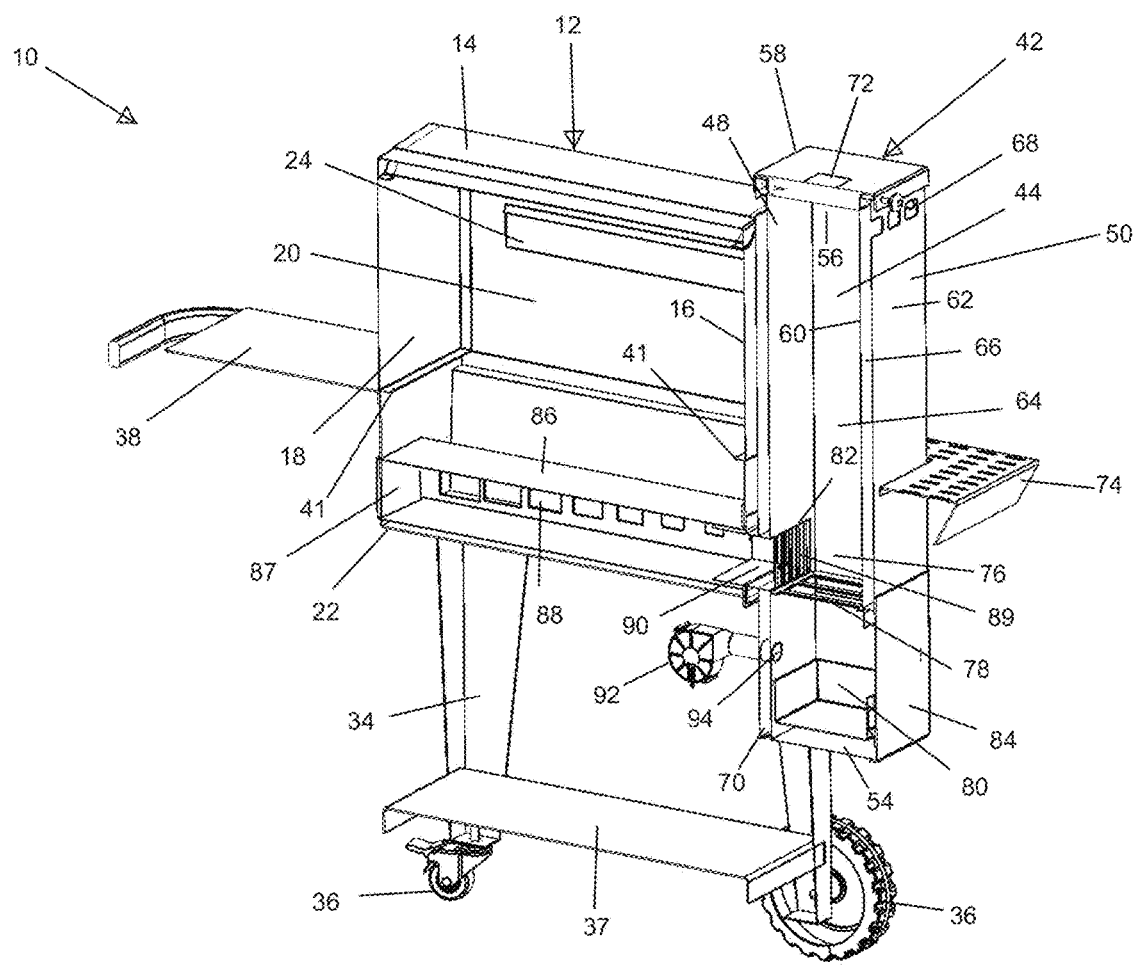
FIG. 8 is a front perspective section view of the first embodiment of the gravity fed smoker as seen along line 8-8 of FIG. 5 in accordance with the present invention.
Figure 9:
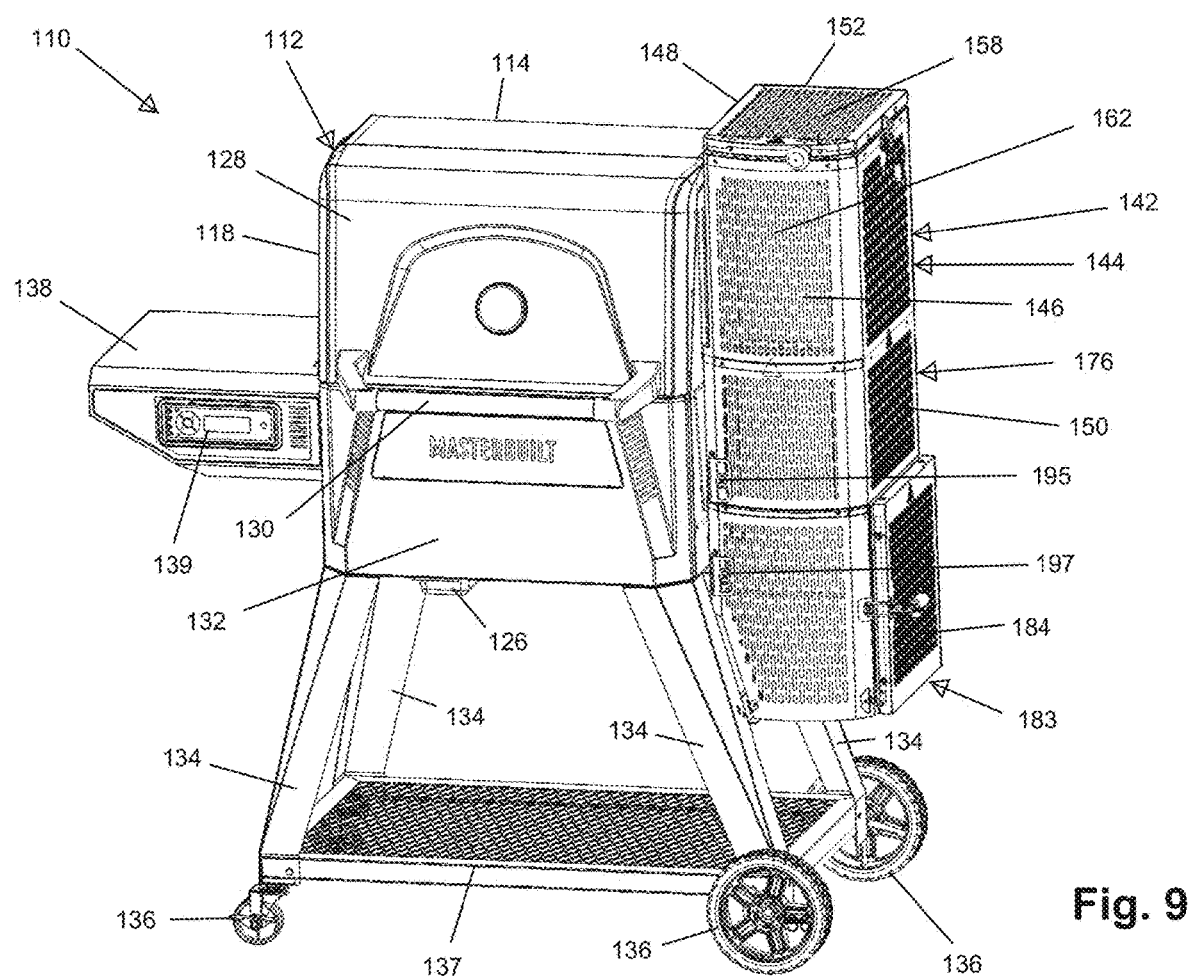
FIG. 9 is a front perspective view of a second embodiment of a gravity fed smoker in accordance with the present invention.
Figure 10:
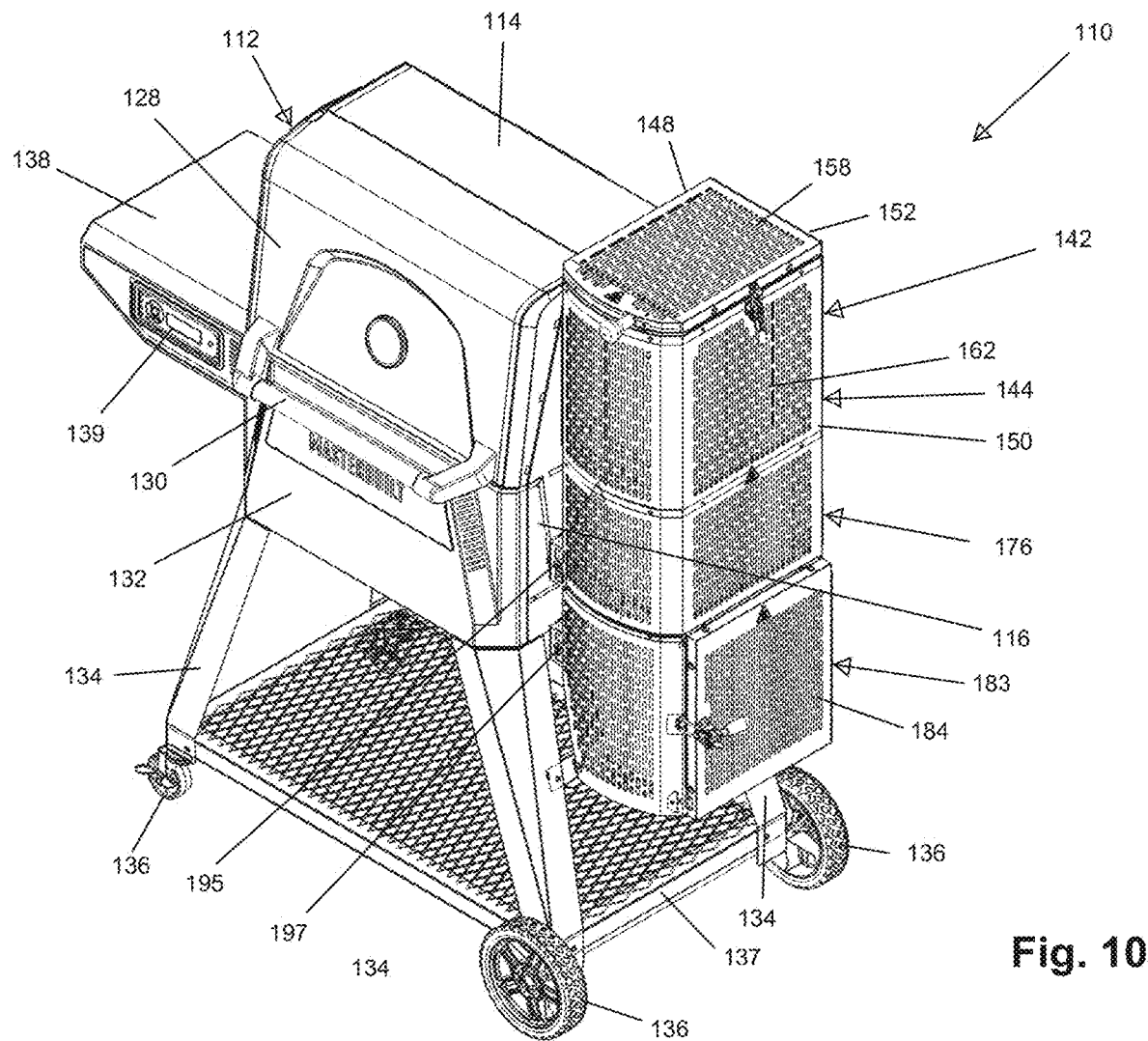
FIG. 10 is a right side perspective view of the second embodiment of the gravity fed smoker in accordance with the present invention.
Figure 11:
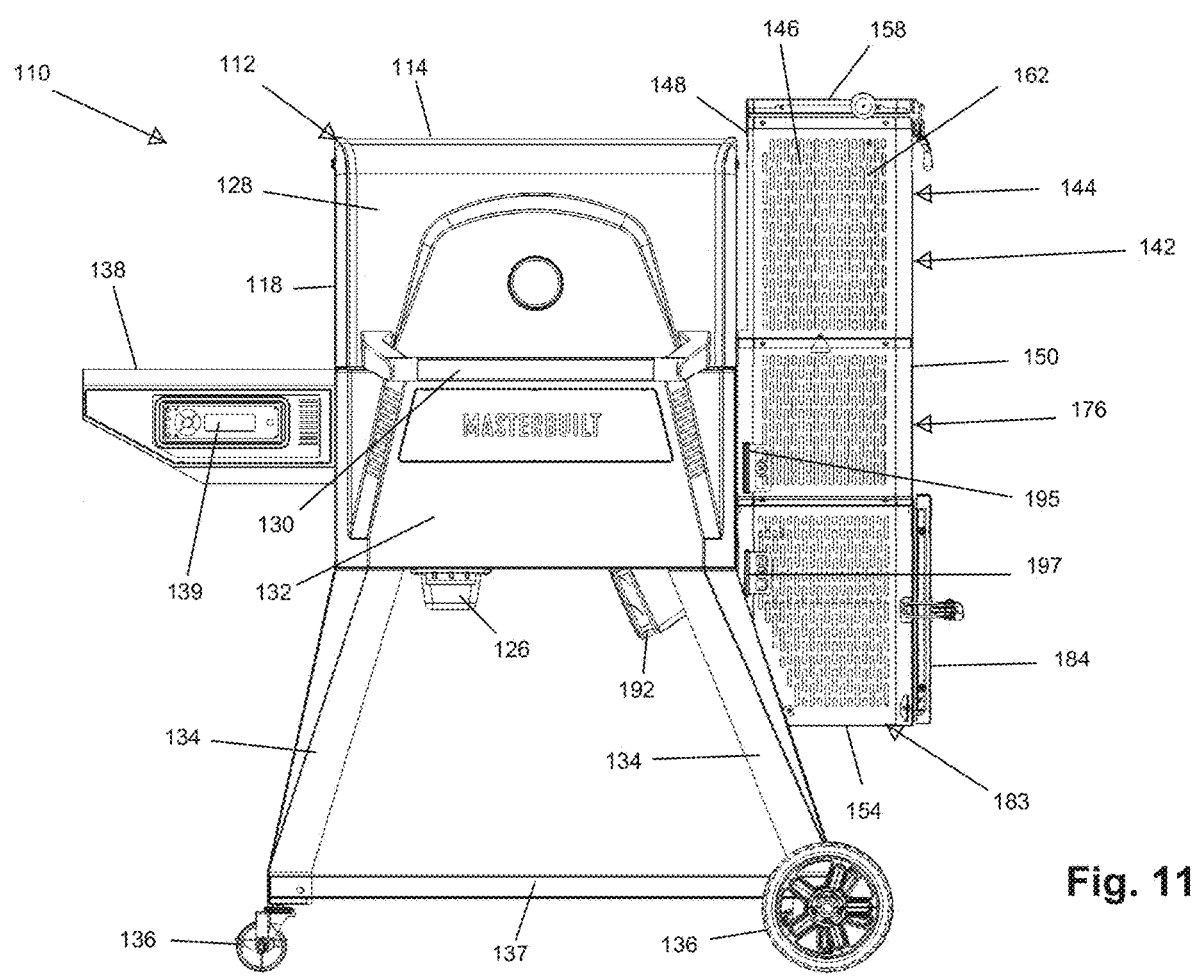
FIG. 11 is a front elevation view of the second embodiment of the gravity fed smoker in accordance with the present invention.
Figure 12:
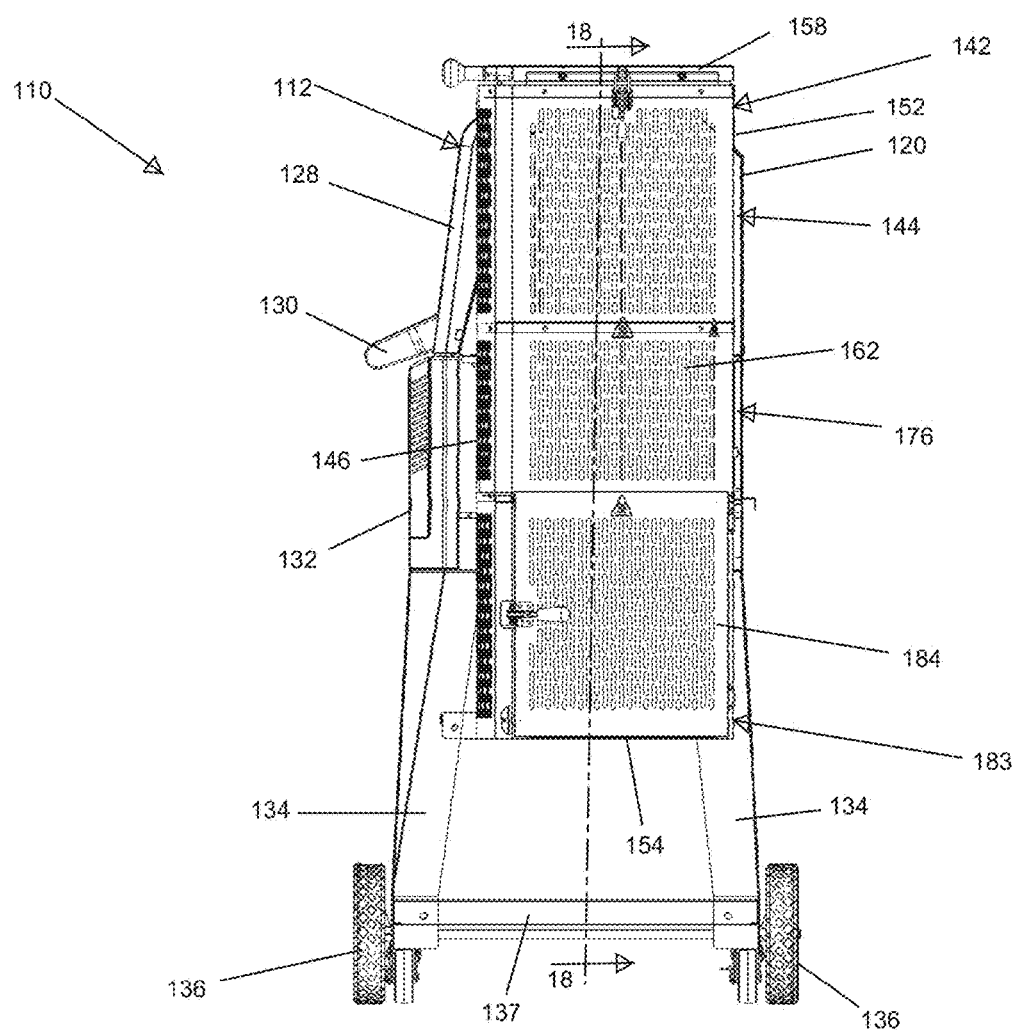
FIG. 12 is a right side elevation view of the second embodiment of the gravity fed smoker in accordance with the present invention.
Figure 13:
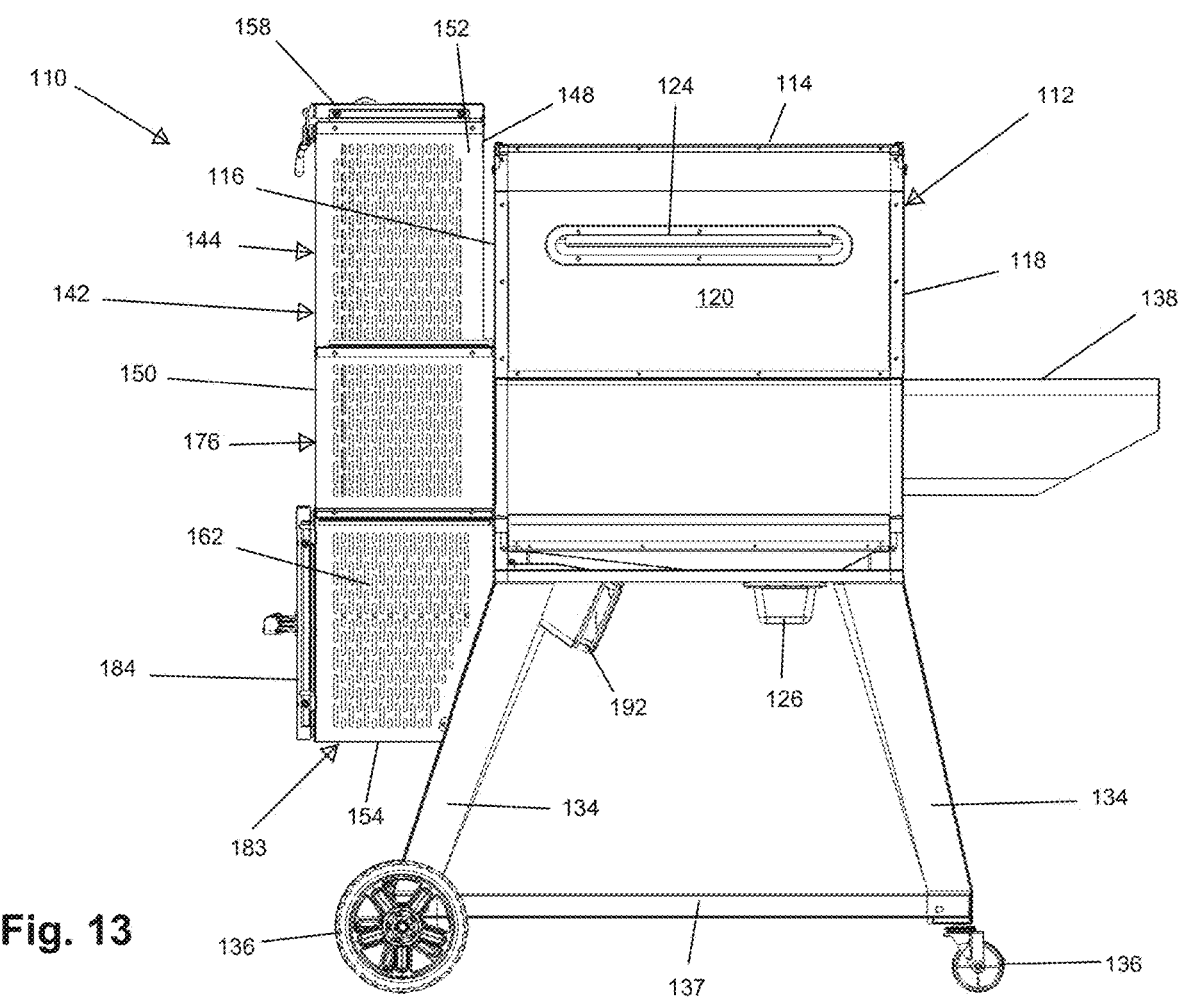
FIG. 13 is a back elevation view of the second embodiment of the gravity fed smoker in accordance with the present invention.
Figure 14:
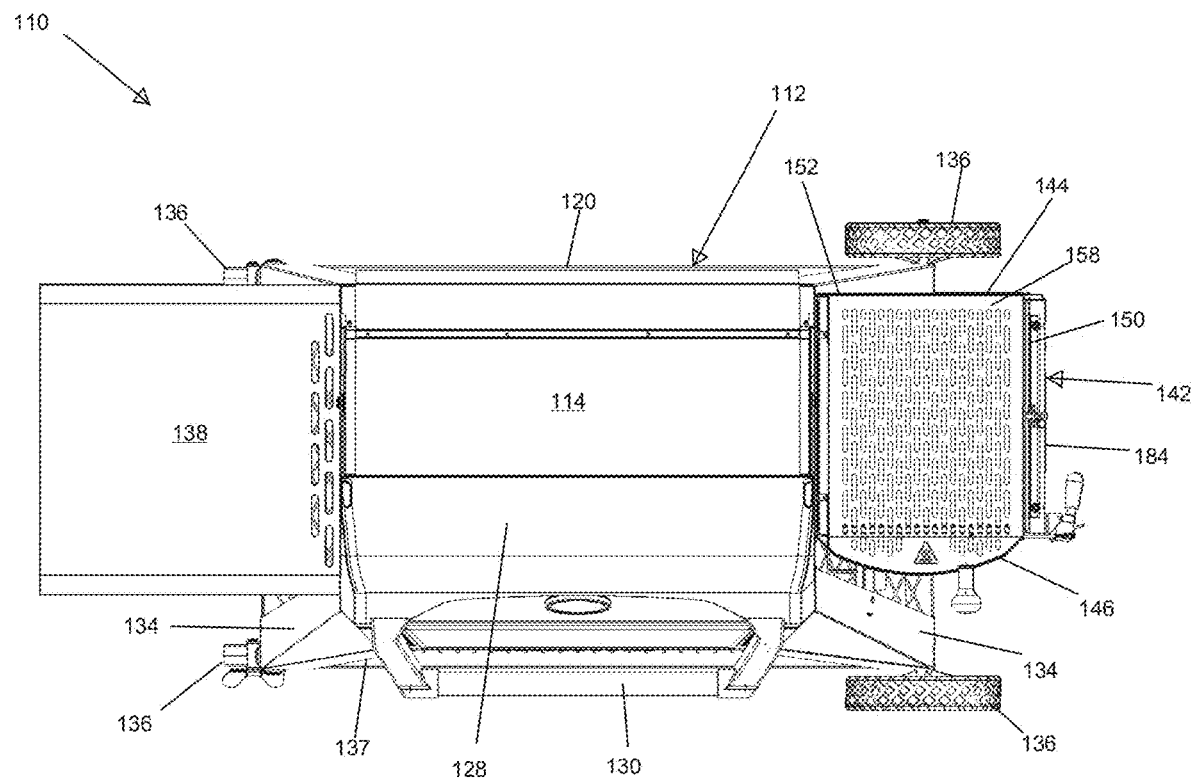
FIG. 14 is a top plan view of the second embodiment of the gravity fed smoker in accordance with the present invention.
Figure 15:
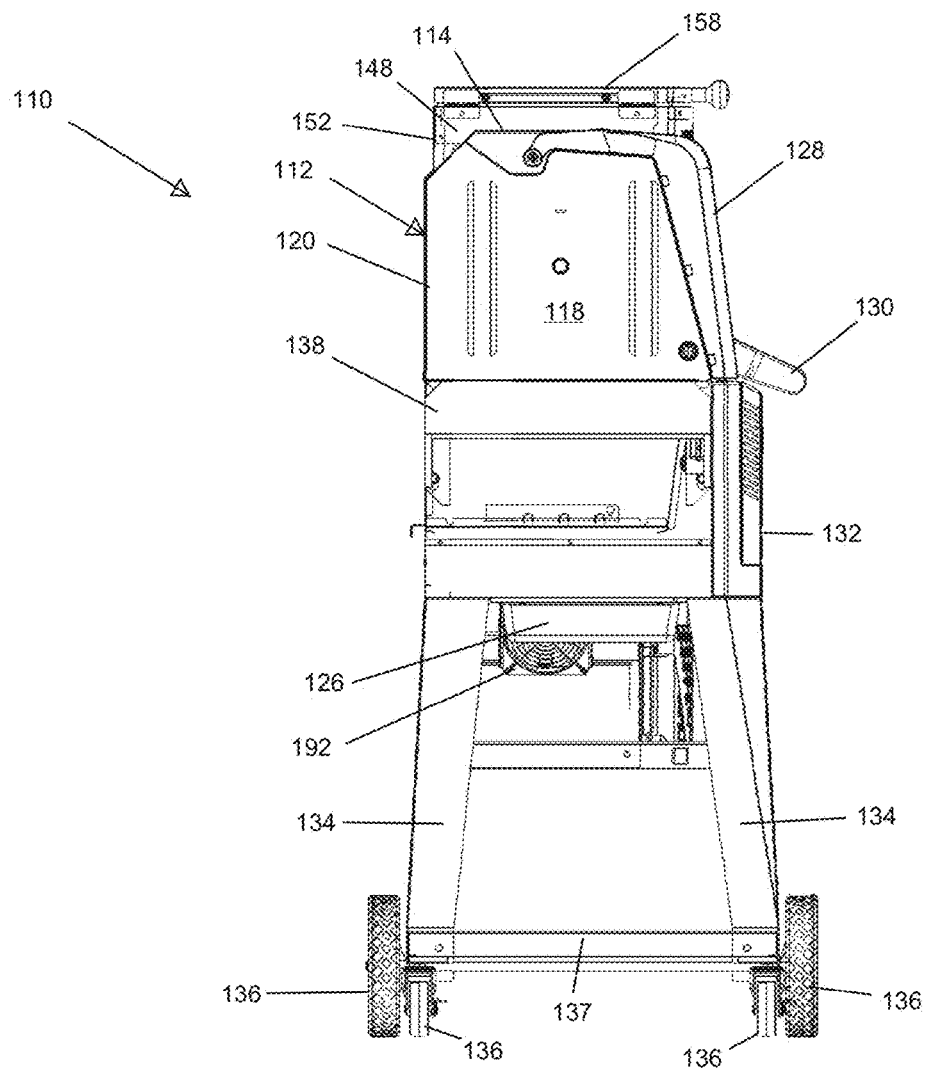
FIG. 15 is a left side elevation view of the second embodiment of the gravity fed smoker in accordance with the present invention.
Figure 16:
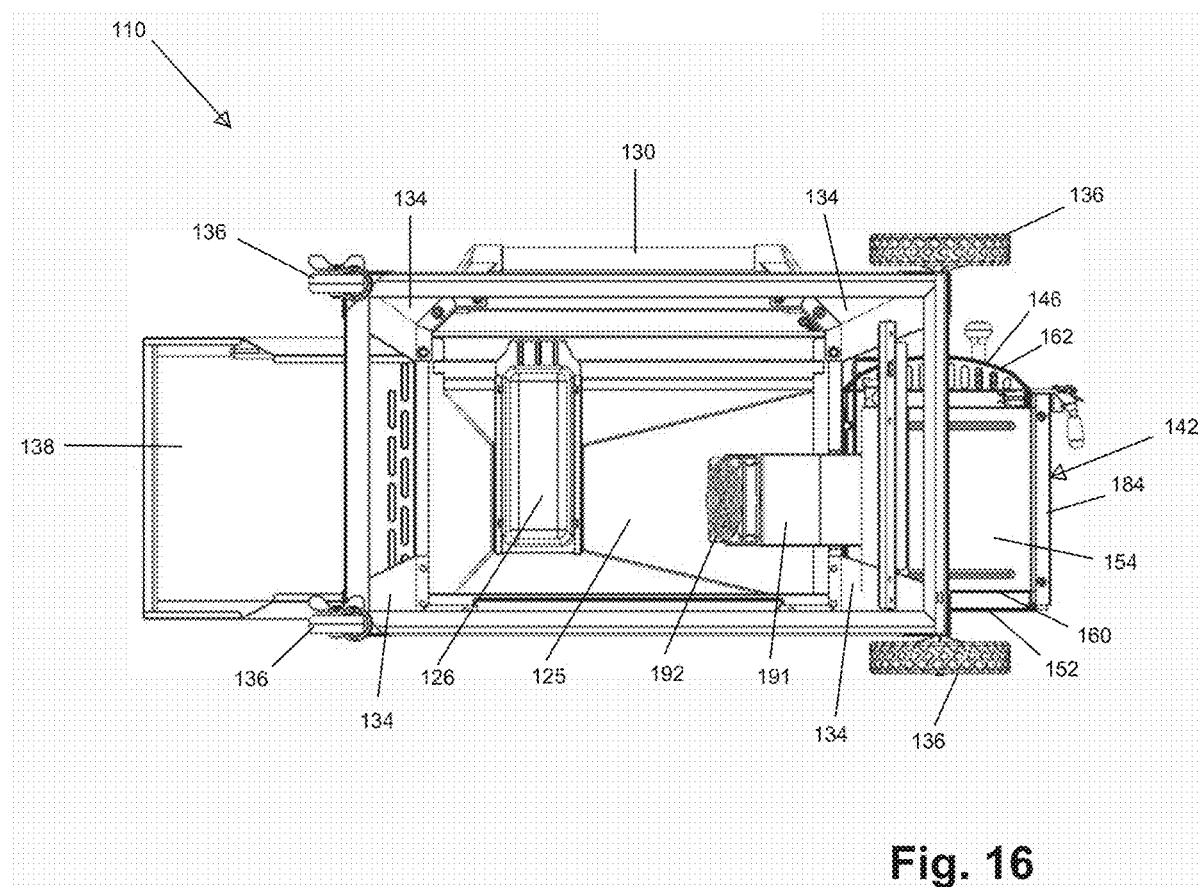
FIG. 16 is a bottom plan view of the second embodiment of the gravity fed smoker with the cart tray removed to reveal detail in accordance with the present invention.
Figure 17:
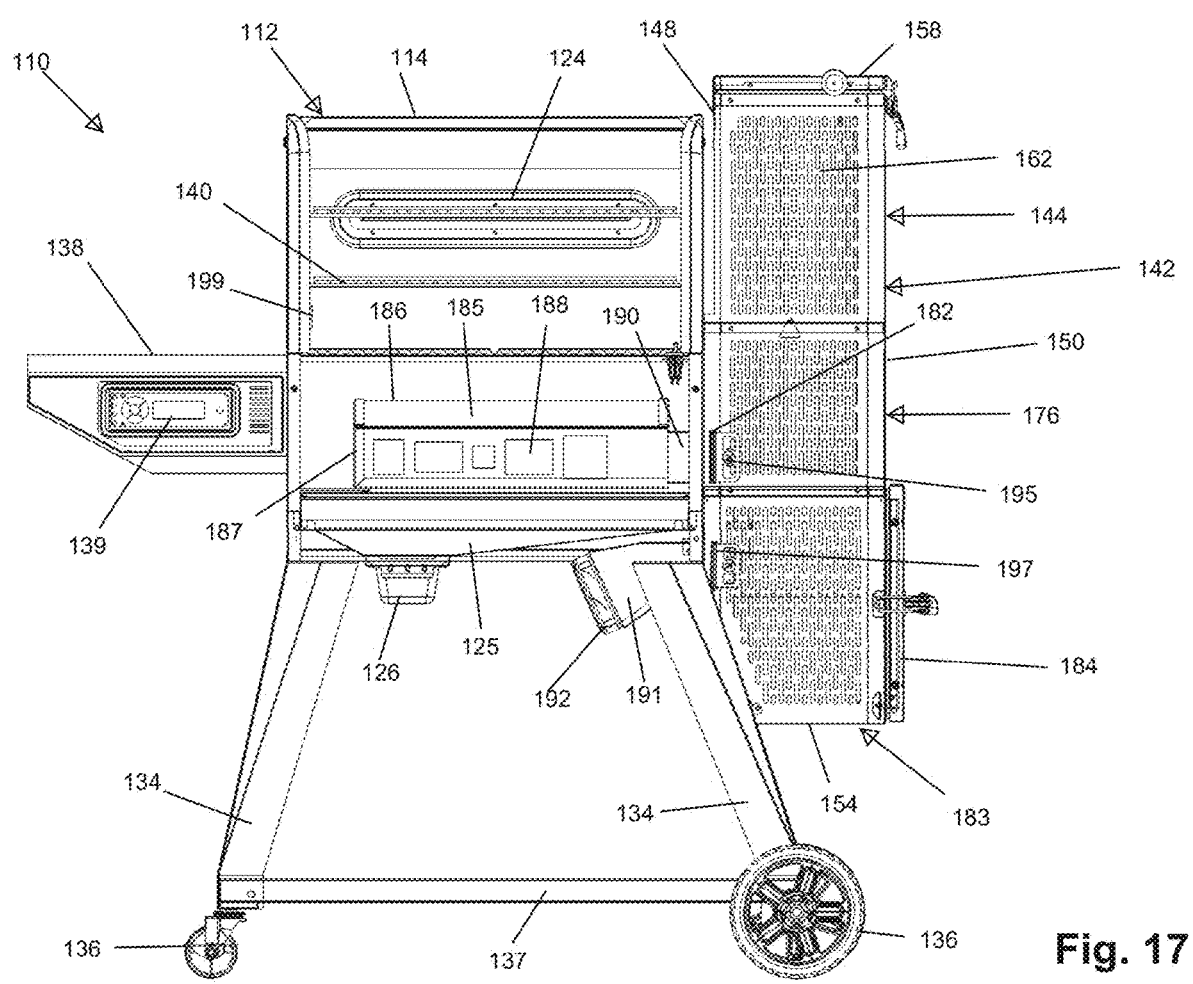
FIG. 17 is a front elevation view of a second embodiment of the gravity fed smoker with portions of the food smoking enclosure removed to reveal internal detail in accordance with the present invention.

FIGS. 1-8 illustrate a first embodiment of the present invention. FIGS. 9-24 illustrate a second embodiment of the present invention. Turning to FIG. 1, a gravity fed smoker 10 includes a food smoking enclosure 12 and an external stack 42. The food smoking enclosure 12 has a front 32, a back 20, a left side 18, a right side 16, a top 14, and a bottom 22. The food smoking enclosure 12 is supported on four legs 34 which in turn are supported on four wheels 36 to facilitate movement of the gravity fed smoker 10. A cart tray 37 extends between the legs below the foods smoking enclosure to provide stability and extra storage space. The front 32 includes a lid 28 for gaining access to the interior of the food smoking enclosure 12. A grill rack 40 (FIG. 7) is supported on the grill rack supports 41 (FIG. 8) within the food smoking enclosure 12. The grill rack 40 in turn supports the food to be cooked and smoked. In FIG. 8 the grill rack 40 has been removed for the sake of clarity. A drip pan (not shown) is supported on the bottom 22 of the food smoking enclosure 12 for catching drippings from the food being cooked and smoked. The back 20 of the food smoking enclosure includes an adjustable smoke outlet 24.

A smoke tunnel 86 extends along the bottom 22 of the food smoking enclosure 12 from the right side 16 to the left side 18. One end of the smoke tunnel 86 has a smoke inlet 90 (FIG. 8) through the right side 16 of the food smoking enclosure 12. The other end 87 of the smoke tunnel 86 is closed. A series of openings 88 in the sides of the smoke tunnel 86 extend along the length of the smoke tunnel 86 to allow smoke and heat to flow from the smoke inlet 90 of the smoke tunnel 86 into the food smoking enclosure 12 and out the smoke outlet 24 of the food smoking enclosure 12. The openings 88 in the smoke tunnel 86 are progressively larger starting from the smoke inlet 90 of the smoke tunnel 86 in order to evenly distribute the smoke and heat from the smoke tunnel 86 into the food smoking enclosure 12. By varying the size and spacing of the openings 88 and by varying the dimensions of the smoke tunnel 86, the smoke tunnel 86 can be tuned to distribute smoke and heat evenly into the smoking enclosure 12 to assure consistent cooking and smoking of the food within the smoking enclosure 12.

The external stack 42 is connected to the right side 16 of the food smoking enclosure 12. The external stack 42 is generally rectangular in shape with a front 46, a left side 48, a right side 50, a back 52, a bottom 54 (FIG. 6), and a top opening 56. The stack 42 includes an upper feed hopper 44, a fire box 76, and a lower stack portion 83. The stack 42 is double walled with an inner wall 60 and an outer wall 62. The inner wall 60 defines an inner chamber 64. A cooling space 66 exists between the inner wall 60 and the outer wall 62. The inner chamber 64 of the external stack 42 includes the fire box 76 with a bottom fire grate 78. The fire box 76 is positioned toward the bottom 54 of the inner chamber 64 of the external stack 42 and adjacent to the smoke tunnel inlet 90 of the smoke tunnel 86. The fire box 76 has a smoke outlet 82 covered by a smoke outlet grate 89 (FIG. 8) that connects to the smoke tunnel inlet 90 of the smoke tunnel 86.

A fan 92 with a fan outlet 94 (FIG. 8) is connected to the inner chamber 64 below the fire grate 78. The amount of air delivered by the fan 92 to the fire grate 78 can be controlled manually or automatically either by use of a variable speed fan or by varying the duty cycle of a constant speed fan.

An ash pan 80 is located in the lower portion 83 of the stack 42 and is supported on the bottom 54 of the inner chamber 64 of the stack 42 below the fire grate 78. The ash pan 80 receives the ash and embers from the fire grate 78. The ash pan 80 also can be loaded with additional wood chunks that will smolder during the cooking and smoking process to add additional smoke flavors. The stack 42 has a lower access door 84 near the bottom 54 of the stack 42 adjacent the ash pan 80 for removal of the ash pan 80 as necessary and for gaining access below the fire grate 78 in order to light the solid fuel supported on the fire grate 78.

The feed hopper 44 is located near the top of the stack 42 and contains the solid fuel, such as charcoal, lump coal, or wood pellets. The feed hopper 44 is positioned above and connected to the top of the fire box 76. The inner chamber 64 of the stack 42 has a top opening 56 for loading fuel into the feed hopper 44. The stack 42 has a top lid 58 that closes the top opening 56 and seals the inner chamber 64. The top lid 58 also includes a lid vent 72 that can be opened and closed in connection with the startup of combustion at the fire grate 78. The outer stack wall 62 has top vents 68 near the top of the stack 42 and bottom vents 70 (FIG. 6) in the bottom 54 of the stack 42 that communicate with the cooling space 66 between the inner stack wall 60 and the outer stack wall 62 so that air can circulate from the bottom vents 70, through the cooling space 66, and out the top vents 68 to cool the inner wall 60 of the stack 46 and keep their outer stack wall 62 at a safe temperature.

A utility tray 38 is attached on the left side 18 of the food smoking enclosure 12 to provide a place for holding food and utensils. A warming tray 74 is attached to the right side 50 of the stack 42 and utilizes the heat from the stack 42 to keep food warm that has already been cooked or to warm plates in anticipation of serving the food.

In operation, the feed hopper 44 is loaded with solid fuel in the form of charcoal, lump coal, or wood pellets. The solid fuel in the feed hopper 44 descends by gravity and comes to rest on the fire grate 78 of the fire box 76. By means of the lower access door 84 at the bottom 54 of the stack 42, the user can access the bottom of the fire grate 78 and light the solid fuel on the fire grate 78. Once the solid fuel has been lit and in order to increase the temperature inside the food smoking enclosure 12 rapidly at startup, the lid vent 72 can be opened, and the fan 92 run at a relatively high speed in order to accelerate combustion within the fire box 76. Once the temperature inside the food smoking enclosure 12 has reached the initial desired high temperature for searing meat in the grill rack 40, the lid vent 72 is closed thereby sealing the inner chamber 64, and the fan 92 speed is controlled to provide air below the fire grate 78 to maintain combustion. The fan 92 forces the resulting smoke and heat out of the fire box smoke outlet 82, through the smoke tunnel inlet 90, into the smoke tunnel 86, out of the smoke tunnel openings 88, and into the food smoking enclosure 12. Because the inner chamber 64 of the stack 42 is sealed by the stack lid 58 and the closed lid vent 72, the solid fuel does not burn up the inner chamber 64. Instead as the solid fuel burns just above the fire grate 78, the ash drops through the fire grate 78 into the ash pan 80 below. As the ash drops through the fire grate

78, the fuel above the fire grate 78 drops under the force of gravity onto the fire grate 78 to replace the spent fuel and ash.

Initially with the rapid startup described above, the grill rack 40 inside the food smoking enclosure 12 can be raised to a temperature between 700° F. and 1000° F. in order to sear meat placed on the grill rack 40. Subsequently, by adjusting the air flow from the fan 92 downward, the temperature inside the food smoking enclosure 12 can be lowered to as low as 140° F. to slowly and continuously cook and smoke the food in the food smoking enclosure 12. The temperature can also be controlled by opening the lid 28 of the food smoking enclosure 12.

The smoker 10 includes a temperature probe and a controller (not shown) that controls the duty cycle or the speed rate of the fan 92. The desired temperature set point is entered into the controller, and the controller drives the speed of the fan 92 to reach the set temperature point. Once the temperature set point has been reached, the controller will reduce the fan's speed to maintain the set point temperature. By stopping the fan, the combustion at the fire grate 78 will shut down, and the solid fuel left in the hopper 44 can be saved the next cooking and smoking operation.

A second embodiment of the present invention is shown in FIGS. 9-24. The second embodiment is a gravity fed smoker 110 that includes a food smoking enclosure 112 and an external stack 142. The food smoking enclosure 112 has a front 132, a back 120, a left side 118, a right side 116, a top 114, and a bottom 122. The food smoking enclosure 112 is supported on four legs 134 which in turn are supported on four wheels 136 to facilitate movement of the gravity fed smoker 110. The front 132 includes a lid 128 for gaining access to the interior of the food smoking closure 112. A grill rack 140 (FIGS. 17-20) is supported on the grill rack supports 141 (FIG. 18) within the food smoking enclosure 112. The grill rack 140 in turn supports the food to be cooked and smoked. A drip shield 125 is supported on the bottom 122 of the food smoking enclosure 112 for catching drippings from the food being cooked and smoked. The drip shield 125 funnels the drippings into a removable drip pan 126. The back 120 of the food smoking enclosure includes an adjustable smoke outlet 124.

A smoke tunnel 186 extends along the bottom 122 of the food smoking enclosure 112 from the right side 116 to the left side 118. One end of the smoke tunnel 186 has a smoke inlet 190 (FIG. 22) through the right side 116 of the food smoking enclosure 112. The other end 187 of the smoke tunnel 186 is closed. A series of openings 188 in the sides of the smoke tunnel 186 extend along the length of the smoke tunnel 186 to allow smoke and heat to flow from the smoke inlet 190 of the smoke tunnel 186 into the food smoking enclosure 112 and out the smoke outlet 124 of the food smoking enclosure 112. The openings 188 in the smoke tunnel 186 are larger at each end and smaller in the middle the smoke tunnel 186. The smoke tunnel 186 is topped by a triangular-shaped cap 185. By varying the size and spacing of the openings 188 and by varying the dimensions of the smoke tunnel 186, the smoke tunnel 186 can be tuned to distribute smoke and heat evenly into the smoking enclosure 112 to assure consistent cooking and smoking of the food within the smoking enclosure 112.

Figure 18:
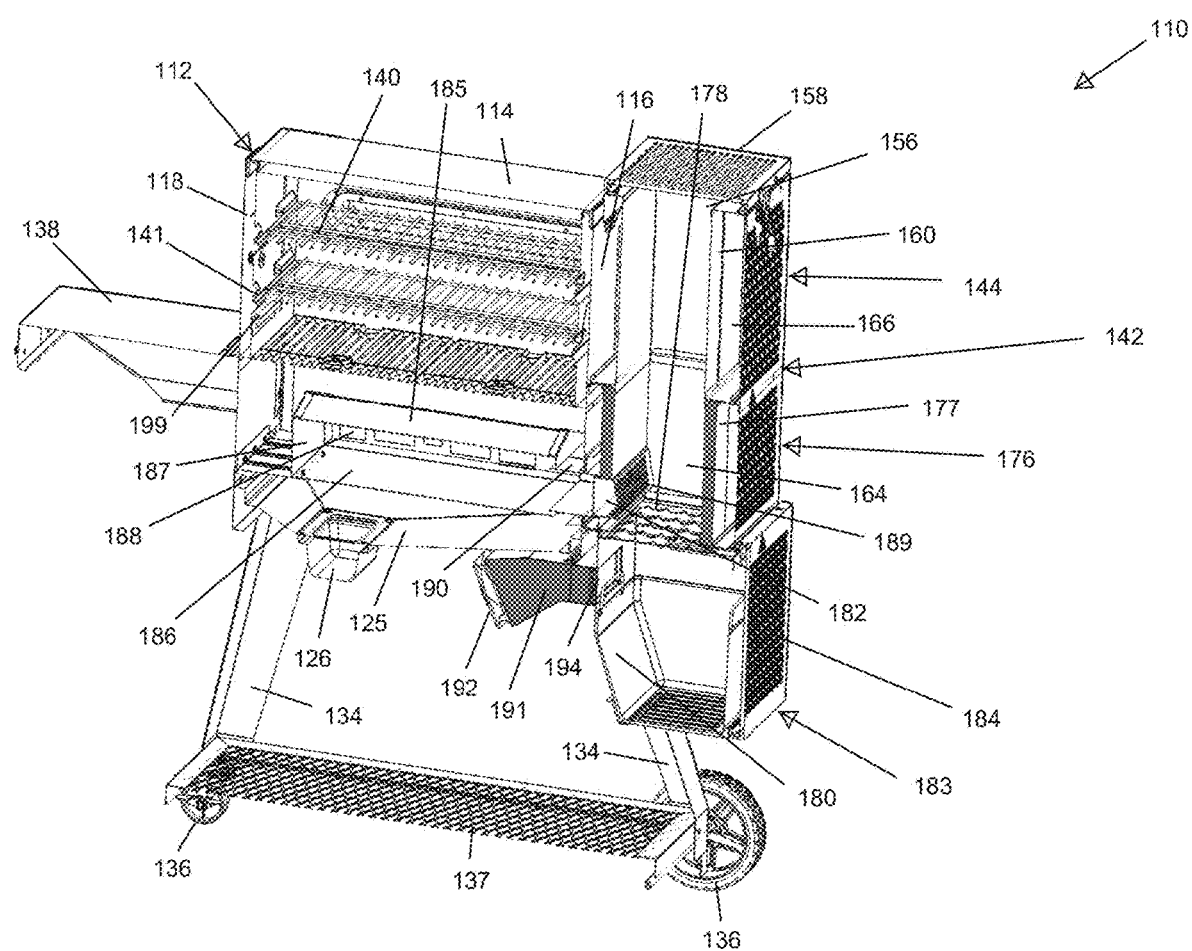
FIG. 18 is a front perspective section view of the second embodiment of the gravity fed smoker with portions of the fire box and hopper removed to show internal detail as seen along line 18-18 of FIG. 12 in accordance with the present invention.
Figure 19:
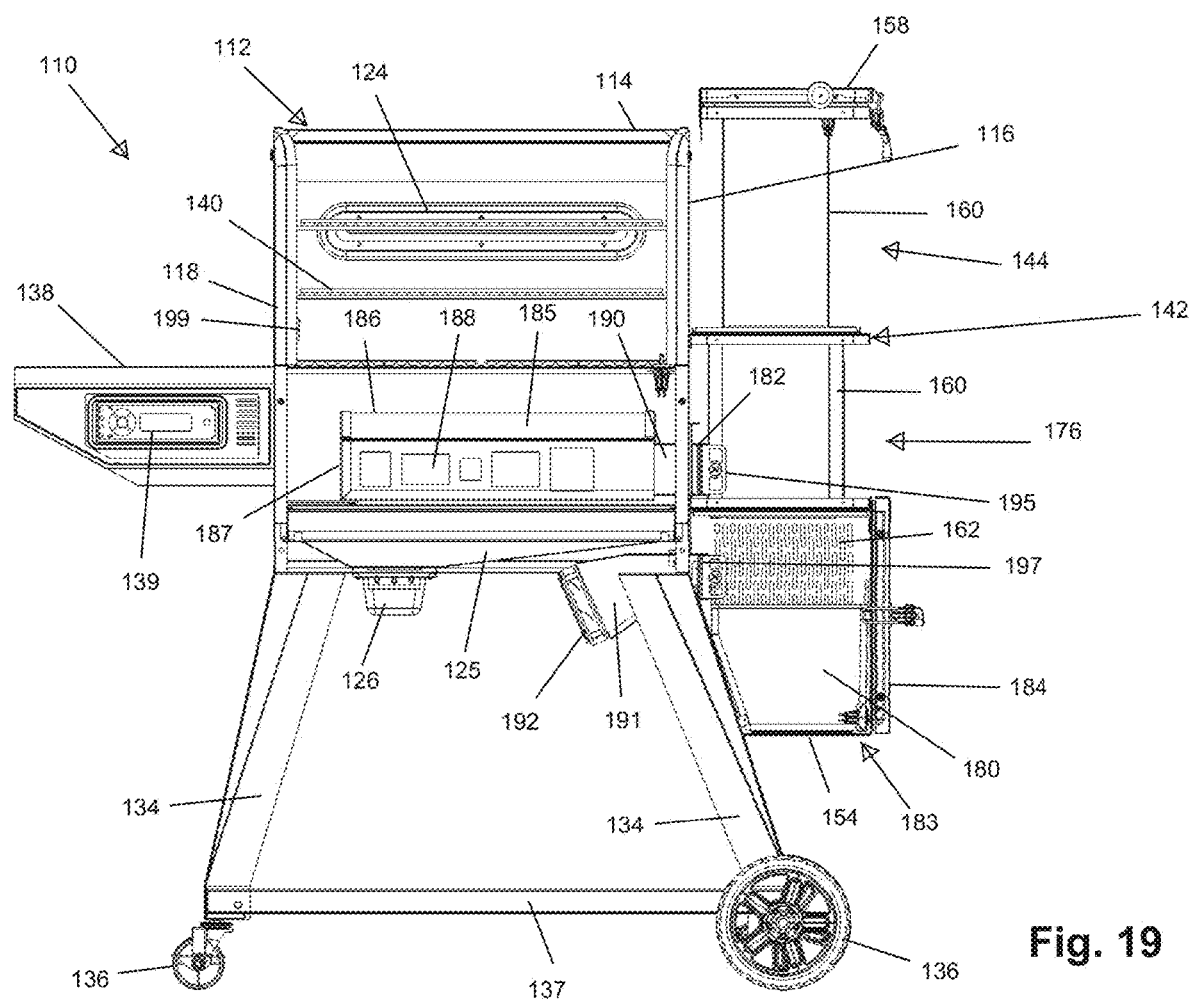
FIG. 19 is a front elevation view of the second embodiment of the gravity fed smoker with portions of the food smoking enclosure, the fire box, and the hopper removed to show internal detail in accordance with the present invention.
Figure 20:
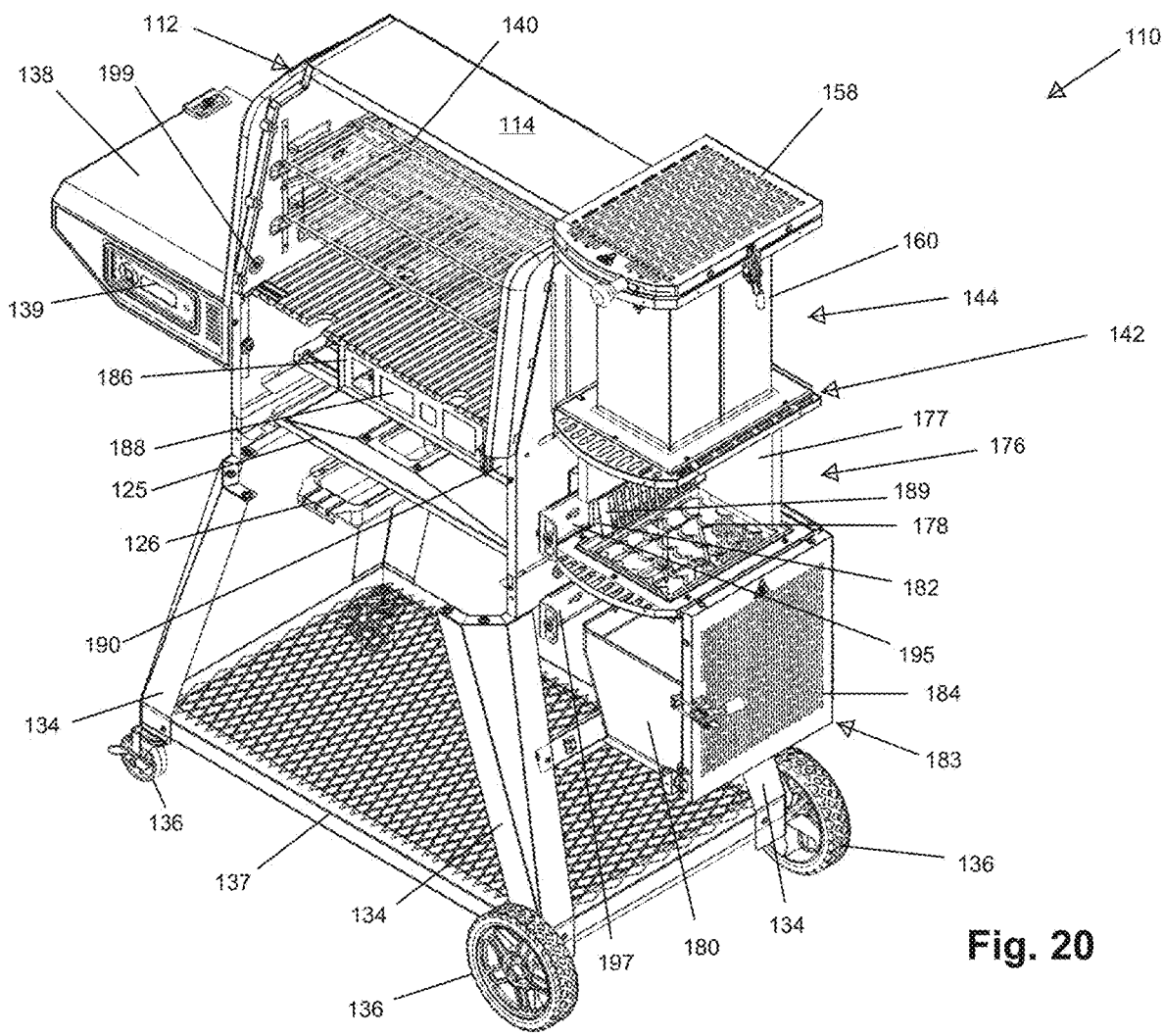
FIG. 20 is a right side perspective view of the second embodiment of the gravity fed smoker with the door and portions of the fire box and the hopper removed to show internal detail in accordance with the present invention.

The external stack 142 is connected to the right side 116 of the food smoking enclosure 112. The external stack 142 is generally rectangular in shape with a front 146, a left side 148, a right side 150, a back 152, a bottom 154, and a top opening 156 (FIG. 18). The stack 142 includes an upper feed hopper 144, a fire box 176, and a lower stack portion 183. The stack 142 is double walled with an inner wall 160 and an outer wall 162. The inner wall 116 defines an inner chamber 164 (FIG. 18). A cooling space 166 exists between the inner wall 160 and the outer wall 162. In order to ensure a safe temperature on the outer wall 162, the outer wall 162 consists of a series of slots allowing free movement of air in the cooling space 166. Particularly, the slots in the outer wall 162 result in the outer wall 162 having an open percentage of 40% to 75%, depending on temperatures of hopper and desired skin temperature.

The fire box 176 is positioned below the feed hopper 144 and above the lower stack portion within the inner chamber 164 of the external stack 142. A fire grate 178 is positioned at the bottom of the fire box 176. The fire box 176 is lined with fire brick 177 to protect the inner wall 160 and lessen the amount of heat transferred into the cooling space 166. The fire box 176 has a smoke outlet 182 that connects to the smoke tunnel inlet 190 of the smoke tunnel 186. A slidable manual smoke damper 195 is interposed between the smoke outlet 182 of the fire box 176 and the smoke tunnel inlet 190 of the smoke tunnel 186. The smoke damper 195 slides between an open position in which smoke can flow from the fire box 176 into the smoke tunnel 186 and a closed position in which smoke cannot flow from the fire box 176 into the smoke tunnel 186. The smoke damper 195 can be manually adjusted to any intermediate position between the open position and the closed position.

Figure 21:
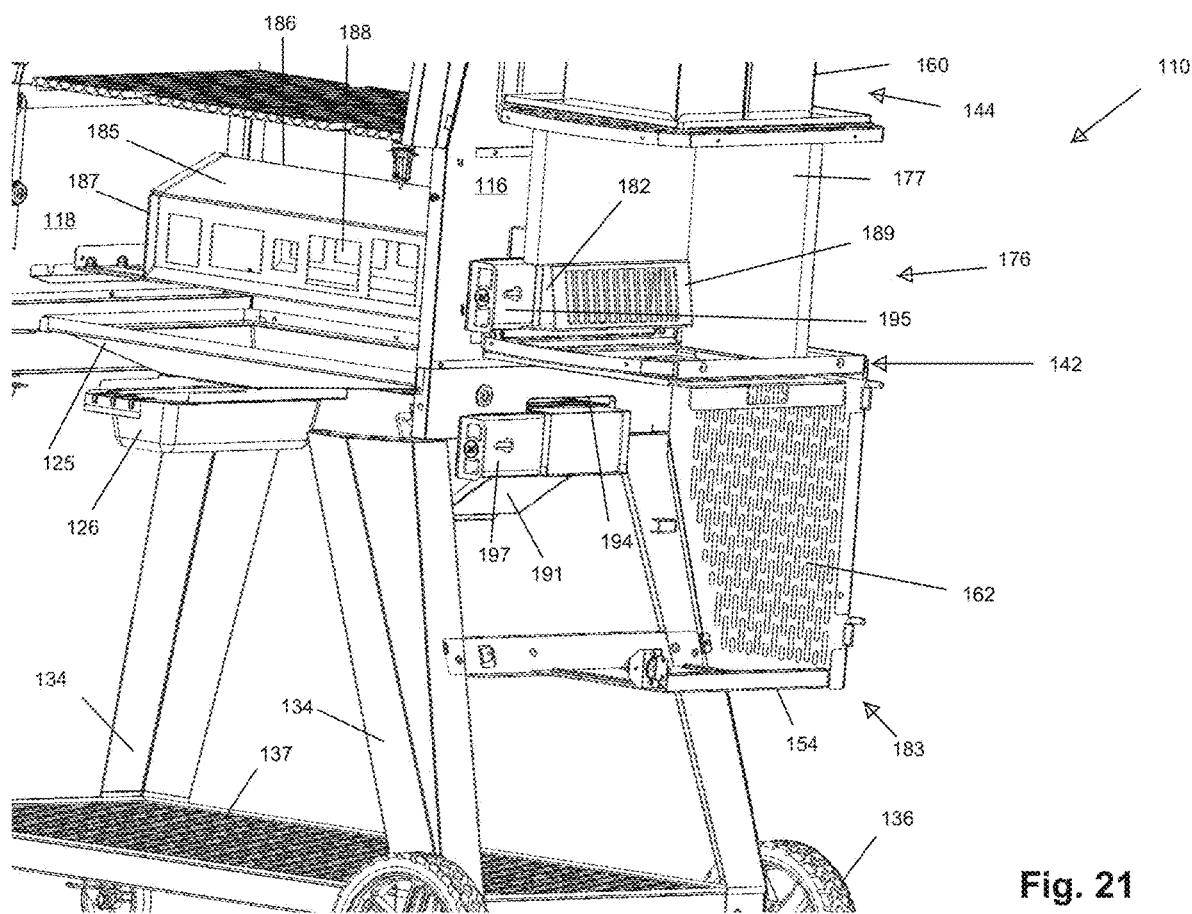
FIG. 21 is an enlarged right side perspective view of the second embodiment of the gravity fed smoker with the door and portions of the fire box and hopper removed to show internal detail in accordance with the present invention.
Figure 22:
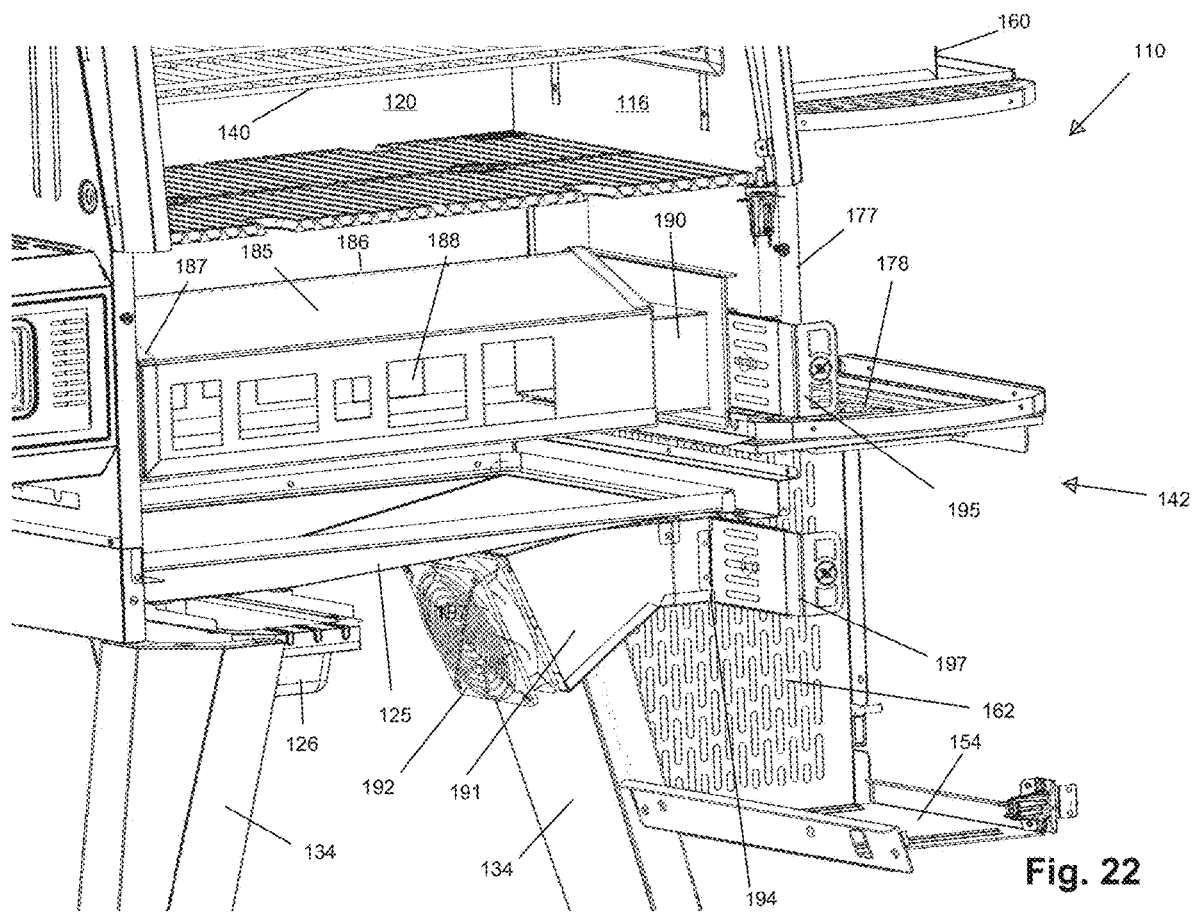
FIG. 22 is an enlarged front perspective view of the second embodiment of the gravity fed smoker with the door and portions the fire box and hopper removed to show internal detail in accordance with the present invention.
Figure 23:
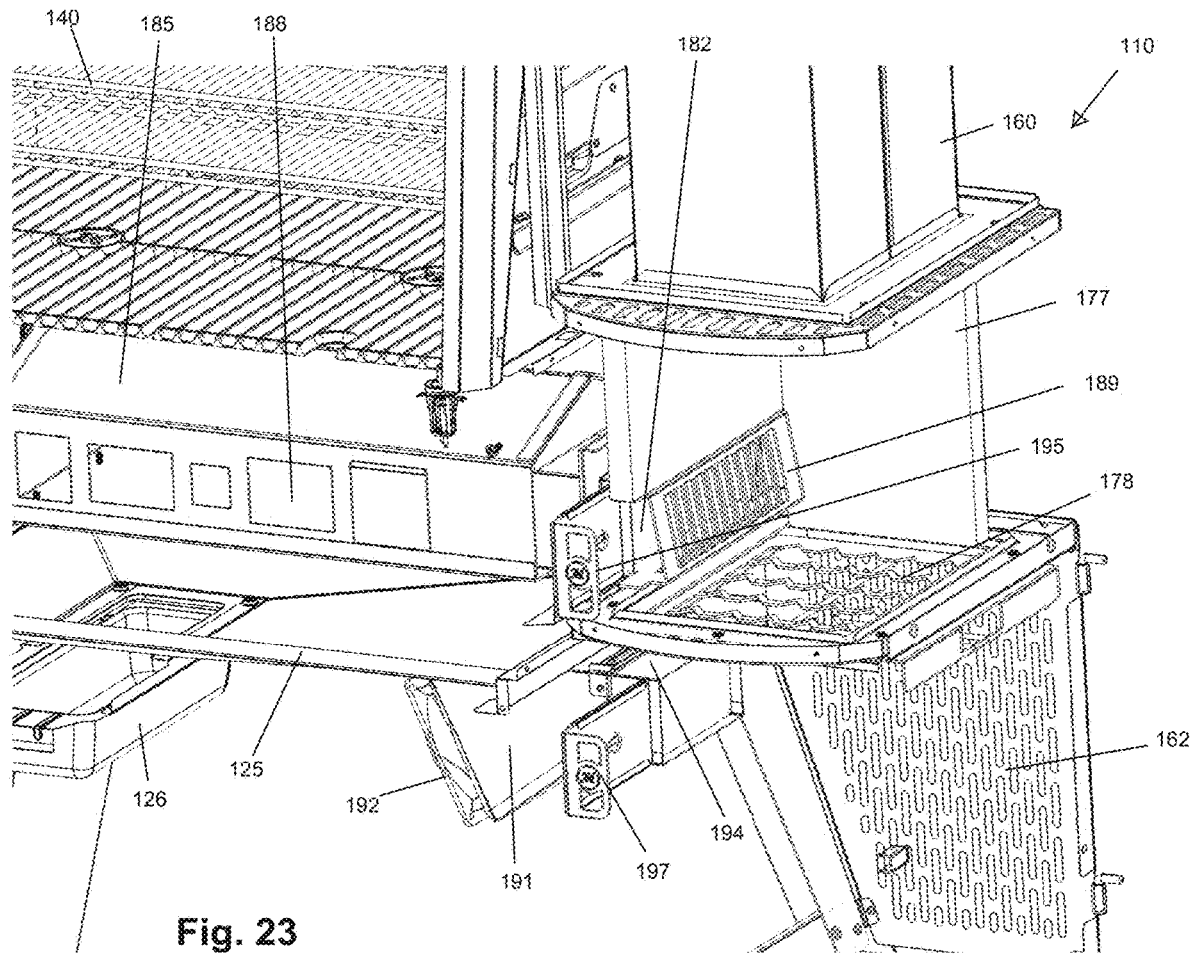
FIG. 23 is an enlarged front perspective view of the second embodiment of the gravity fed smoker with the door and portions the fire box and hopper removed to show internal detail in accordance with the present invention.
Figure 24:
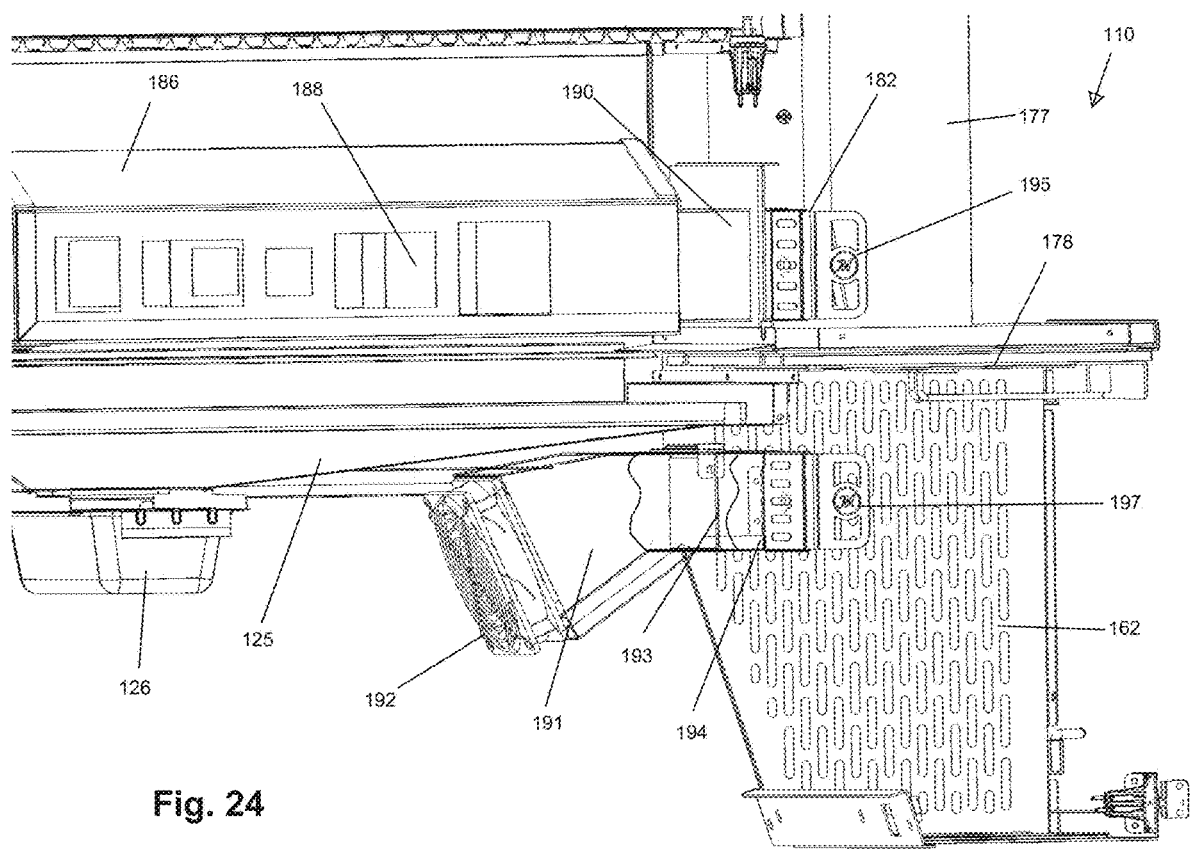
FIG. 24 is an enlarged front perspective view of the second embodiment of the gravity fed smoker with the door and portions the fire box and hopper removed to show internal detail in accordance with the present invention.

An angled grate 189, which forms part of the fire box outlet 182, is positioned on the fire box side of the smoke damper 195 as shown in FIG. 21. The angled grate 189 catches any embers or other solid pieces of fuel that might be created in the fire box and propelled toward the smoke outlet 182 and the smoke damper 195 by air flow created by and a fan 192 (FIG. 22). Once an ember is caught by the angled grate 189, the ember slides down the angled grate 189 and back into the fire box 176. Consequently, angled grate 189 keeps live embers from passing through the smoke outlet 182 and into the smoke tunnel inlet 190 and the smoke tunnel 186.

The fan 192 is mounted to a fan tunnel 191 which in turn is mounted to the stack 142. The fan tunnel 191 has a fan outlet 194 that is connected to the inner chamber 164 below the fire grate 178. A check flapper 193 is pivotally mounted in the fan tunnel 191. The check flapper 193 allows air to flow from the fan 192 into the fire box 176 but precludes air from flowing from the fire box 176 toward the fan 192. A slidable manual combustion air damper 197 is positioned at the fan outlet 194. The combustion air damper 197 slides between an open position in which combustion air can flow from the fan 192 into the fire box 176 and a closed position in which combustion air cannot flow from the fan 192 into the fire box 176. The combustion air damper 197 can be manually adjusted to any intermediate position between the open position and the closed position. The amount of air delivered by the fan 192 to the fire box 176 can be controlled by varying the speed of the fan or by manually adjusting the combustion air damper 197 between the open position, the closed position, and any intermediate position.

An ash pan 180 is supported on the bottom 154 of the inner chamber 164 of the stack 142 below the fire grate 178. The ash pan 180 receives the ash and embers from the fire grate 178. The ash pan 180 also can be loaded with additional wood chunks that will smolder during the cooking and smoking process to add additional smoke flavor. The stack 142 has a lower access door 184 near the bottom 154 of the stack 142 adjacent the ash pan 180 for removal of the ash pan 180 as necessary and for lighting the solid fuel supported on the fire grate 178.

The inner chamber 164 also includes a feed hopper 144 for containing the solid fuel, such as charcoal, lump coal, or wood pellets. The feed hopper 144 is positioned above and connected to the top of the fire box 176. The inner chamber 164 of the stack 142 has a top opening 156 (FIG. 18) for loading fuel into the feed hopper 144. The stack 142 has a top lid 158 that closes the top opening 156 and seals the inner chamber 164.

A utility tray 138 is attached on the left side 118 of the food smoking enclosure 112 to provide a place for holding food and utensils. An additional storage shelf 137 is provided below the food smoking enclosure 112.

In operation, the feed hopper 144 is loaded with solid fuel in the form of charcoal, lump coal, or wood pellets. The solid fuel in the feed hopper 144 descends by gravity and comes to rest on the fire grate 178 of the fire box 176. By means of the lower access door 184 at the bottom of the stack 142, the user can access the bottom of the fire grate 178 and light the solid fuel on the fire grate 178. Once the solid fuel has been lit and in order to increase the temperature inside the food smoking enclosure 112 rapidly at startup, the combustion air damper 197 is opened, the fan 192 run at a relatively high speed in order to accelerate combustion within the fire box 176, and the smoke damper 195 is open to facilitate air circulation through the fire grate 178. Once the temperature inside the food smoking enclosure 112 has reached the initial desired high temperature for searing meat in the grill rack 140, the cooking temperature inside the food smoking enclosure 112 can be controlled by adjusting the fan speed, manually adjusting the combustion air damper 197 and manually adjusting the smoke damper 195. Because the inner chamber 164 of the stack 142 is sealed by the stack lid 158 and by limiting the combustion air, the solid fuel does not burn up the inner chamber 164. Instead as the solid fuel burns just above the fire grate 178, the ash drops through the fire grate 178 into the ash pan 180 below. As the ash drops through the fire grate 178, the fuel above the fire grate 178 drops under the force of gravity onto the fire grate 178 to replace the spent fuel and ash.

The smoker 110 includes an enclosure temperature sensor 185, a temperature probe 199, and a controller 139 that controls the speed of the fan 192. The desired temperature set point for the smoking enclosure 112 is entered into the controller, and the controller will drive the fan 192 to reach the set temperature point. Once enclosure temperature sensor 185 reaches the temperature set point, the controller 139 will reduce the fan's speed to maintain the set point temperature. The controller 139 also determines when the cooking process has been completed based on receiving temperature data from the temperature probe 199.

Once the cooking process has been completed, the fan 192 is turned off, and the smoke damper 195 and the combustion air damper 197 are closed. With the fan 192 turned off, the smoke damper 195 closed, and the combustion air damper 197 closed, the inner chamber 164 of the stack 142 is substantially deprived of combustion air. Without combustion air, the fire in the fire box 176 is extinguished thereby saving fuel in the feed hopper 144 and the top of the fire box 176.

While this invention has been described with reference to preferred embodiments thereof, it is to be understood that variations and modifications can be affected within the spirit and scope of the invention as described herein and as described in the appended claims.

We claim:

1. An apparatus for cooking and smoking a food product comprising:
   a. an enclosure including:
      i. at least one cooking rack located within the enclosure for holding the food product to be cooked, the at least one cooking rack positioned above a bottom area within the enclosure; and
      ii. a smoke inlet for introducing smoke and heat into the enclosure;
   b. a stack external to the enclosure, the stack comprising an opening and the stack further comprising:
      i. a fire box for combusting fuel, the fire box located below the opening including:
         (a) a fire box outlet configured to permit smoke and heat to be introduced from the combusting fuel into the enclosure through the smoke inlet;
      ii. a fuel hopper positioned for gravity feeding fuel into the fire box;
   c. a smoke tunnel positioned within the bottom area of the enclosure, the smoke tunnel comprising a hollow structure having a first distal end and a second distal end located opposite each other along a horizontal axis within the bottom area of the enclosure, the hollow structure of the smoke tunnel further comprising at least one outer wall that surrounds at least a portion of a hollow space extending along the horizontal direction within the bottom area of the enclosure, wherein one or more openings are positioned along the outer wall; and
   d. a fan configured to deliver air from outside of the apparatus into the fire box to combust the fuel and create a flow of air from the combusting fuel in the fire box, through the fire box outlet, through the smoke inlet and into the hollow space of the smoke tunnel, and out of the one or more openings of the smoke tunnel to the cooking grate.

2. The apparatus of claim 1, wherein the stack includes an inner stack wall and an outer stack wall with a cooling space between the inner stack wall and the outer stack wall.

3. The apparatus of claim 2, wherein the outer stack wall has a series of openings configured to allow free movement of air within the cooling space.

4. The apparatus of claim 3, wherein openings in the outer wall result in the outer wall having an open percentage of from 40% to 75%.

5. The apparatus of claim 1, wherein the fire box outlet includes an adjustable smoke damper for controlling the amount of smoke generated in the fire box that passes through the fire box outlet.

6. The apparatus of claim 1, wherein the fire box outlet includes an angled grate for catching embers or pieces of fuel and precluding such embers or pieces of fuel from entering the smoke inlet.

7. The apparatus of claim 1, further comprising a fan tunnel with a fan outlet configured to provide air from the fan into the fire box and wherein the fan tunnel further comprises a check flapper.

8. The apparatus of claim 7, wherein the fan outlet includes an air damper configured to control an amount of air delivered to the fire box from the fan.

9. The apparatus of claim 1, wherein the amount of air delivered by the fan to the fire box is controlled at least in part by adjusting fan speed.

10. The apparatus of claim 1, wherein the amount of air delivered by the fan to the fire box is controlled at least in part by cycling the fan on and off.

11. An apparatus for cooking and smoking a food product comprising:
 a. an enclosure including a smoke inlet; and
 b. a stack external to the enclosure, the stack comprising:
  i. a fire box for combusting fuel, the fire box comprising a fire grate and a fire box outlet, the fire box configured to provide smoke and heat from the combusting fuel through the fire box outlet to the smoke inlet of the enclosure;
  ii. a fuel hopper comprising an opening for receiving fuel, the fuel hopper configured to gravity feed the fuel into the fire box; and
 c. a smoke tunnel positioned within a bottom area of the enclosure, the smoke tunnel comprising a hollow structure having a first distal end and a second distal end located opposite each other along a horizontal axis within the bottom area of the enclosure, such that when the smoke tunnel is positioned within the bottom area of the enclosure, the smoke tunnel extends in a horizontal direction across the bottom area of the enclosure, the hollow structure of the smoke tunnel further comprising at least one outer wall that surrounds at least a portion of a hollow space extending along the horizontal direction within the bottom area of the enclosure, wherein one or more openings are positioned along the outer wall; and
 d. a fan configured to deliver air from outside of the apparatus into the fire box to combust the fuel and create a flow of air from the combusting fuel in the fire box, through the fire box outlet, through the smoke inlet and into the hollow space of the smoke tunnel, and out of the one or more openings of the smoke tunnel within the bottom area of the enclosure.

12. The apparatus of claim 11, wherein the fan is disposed at least partially within a fan tunnel, the fan tunnel mounted to the stack and comprising a fan outlet.

13. The apparatus of claim 12, further comprising a check flapper disposed within the fan tunnel.

14. The apparatus of claim 11, further comprising a controller operatively coupled to the fan and configured to control the temperature within the enclosure.

15. The apparatus of claim 11, where the fire box further comprises a fire grate disposed in a bottom portion of the fire box.

16. The apparatus of claim 15, further comprising an ash pan disposed below the fire grate.

17. The apparatus of claim 15, wherein the fire box further comprises an angled grate disposed between the fire box outlet and the fire box.

18. An apparatus comprising:
 a. an enclosure for cooking and smoking food, the enclosure comprising a cooking rack and a bottom area below the cooking rack;
 b. a stack external to the enclosure, the stack comprising:
  i. a fuel hopper comprising an opening for receiving fuel;
  ii. a fire box configured to receive fuel from the fuel hopper, wherein the fire box is further configured to provide smoke and heat to the enclosure; and
 c. a smoke tunnel positioned within the bottom area of the enclosure, the smoke tunnel comprising:
  i. a first end and a second end separated by a length along the smoke tunnel;
  ii. at least one side wall that defines a hollow space for receiving smoke and heat from the fire box between the first and second ends; and
  iii. a plurality of openings within the at least one side wall for delivering smoke and heat into the bottom area of the enclosure, wherein the plurality of openings are positioned on the at least one side wall along at least half of the length between the first end and the second end of the smoke tunnel;
 d. a fan configured to deliver air from outside of the apparatus into the fire box to combust the fuel and create a flow of air from the combusting fuel in the fire box, into the hollow space of the smoke tunnel, and out of the plurality of openings of the smoke tunnel within the bottom area of the enclosure.

19. The apparatus of claim 18, wherein at least one of the plurality of openings positioned along the at least one side wall of the smoke tunnel is a different size than at least another opening of the plurality of openings.

20. The apparatus of claim 18, wherein the smoke tunnel further comprises a top wall that is triangular-shaped.

21. The apparatus of claim 20, wherein the hollow space has a pentagonal-shaped cross-section.

22. The apparatus of claim 18, wherein the first end and second end of the smoke tunnel are separated by the length along a horizontal axis.

* * * * *